United States Patent
Krinsky et al.

(10) Patent No.: US 10,777,217 B2
(45) Date of Patent: Sep. 15, 2020

(54) PERFORMANCE SENSITIVE AUDIO SIGNAL SELECTION

(71) Applicant: AT&T INTELLECTUAL PROPERTY I, L.P., Atlanta, GA (US)

(72) Inventors: Jeffrey A. Krinsky, Woodinville, WA (US); Haywood S. Peitzer, Randolph, NJ (US); James Gordon Beattie, Jr., Bergenfield, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 166 days.

(21) Appl. No.: 15/907,260

(22) Filed: Feb. 27, 2018

(65) Prior Publication Data

US 2019/0267026 A1 Aug. 29, 2019

(51) Int. Cl.
*G10L 25/60* (2013.01)
*G10L 15/26* (2006.01)

(52) U.S. Cl.
CPC ............. *G10L 25/60* (2013.01); *G10L 15/26* (2013.01)

(58) Field of Classification Search
CPC ................................. G10L 25/60; G10L 15/26
See application file for complete search history.

(56) References Cited

U.S. PATENT DOCUMENTS

| | | |
|---|---|---|
| 5,539,908 A | 7/1996 | Chen et al. |
| 6,339,756 B1 | 1/2002 | Hinderks |
| 6,738,351 B1 | 5/2004 | Qureshi et al. |
| 7,286,562 B1 | 10/2007 | Vargo et al. |
| 7,295,549 B2 | 11/2007 | Pepin et al. |
| 7,546,508 B2 | 6/2009 | Greer |
| 7,768,998 B1 | 8/2010 | Everson et al. |
| 7,821,953 B2 | 10/2010 | Yarlagadda et al. |
| 8,055,799 B2 | 11/2011 | Lin et al. |

(Continued)

FOREIGN PATENT DOCUMENTS

| | | |
|---|---|---|
| CN | 105812439 | 7/2016 |
| EP | 1014738 | 3/2001 |

(Continued)

OTHER PUBLICATIONS

US 9,560,357 B2, 01/2017, Fallon et al. (withdrawn)

(Continued)

*Primary Examiner* — Mohammad K Islam
(74) *Attorney, Agent, or Firm* — Amin, Turocy & Watson, LLP

(57) ABSTRACT

Performance sensitive selection of audio signal data is disclosed. A first rank value for the processed audio signal data can be based on a level of fidelity to an input audio signal. A second rank value for the processed audio signal data can be based on a performance metric of a processing scheme for processing the input audio signal into the processed audio signal. A third rank for the processed audio signal data can be based on an indication of a level of satisfaction for performance of the processed audio signal by a receiving device. A fourth rank for the processed audio signal data can be based on a network condition for a network conveying the processed audio signal to a device for performing the processed audio signal. Selection of the processed audio signal data can be based on the first, second, third, fourth rank, or combinations thereof.

20 Claims, 10 Drawing Sheets

(56) References Cited

U.S. PATENT DOCUMENTS

| | | | |
|---|---|---|---|
| 8,423,427 B2 | 4/2013 | Mikkelsen et al. | |
| 8,706,272 B2 | 4/2014 | Lindahl et al. | |
| 8,812,316 B1* | 8/2014 | Chen | G10L 15/26 |
| | | | 704/10 |
| 8,817,617 B2 | 8/2014 | Hellwig et al. | |
| 8,842,568 B2 | 9/2014 | Awais | |
| 8,867,610 B2 | 10/2014 | Fallon et al. | |
| 9,129,596 B2* | 9/2015 | Tachibana | G10L 13/02 |
| 9,449,602 B2 | 9/2016 | Ooi et al. | |
| 9,685,173 B2* | 6/2017 | Sharma | G10L 25/60 |
| 9,729,726 B2 | 8/2017 | Li et al. | |
| 9,842,604 B2 | 12/2017 | Son et al. | |
| 9,870,784 B2* | 1/2018 | Sharma | G10L 25/60 |
| 10,140,973 B1* | 11/2018 | Dalmia | G06F 17/2785 |
| 10,147,428 B1* | 12/2018 | Shastry | G10L 15/26 |
| 10,249,318 B2* | 4/2019 | Kaniewska | G10L 21/0232 |
| 10,276,149 B1* | 4/2019 | Liang | G10L 13/033 |
| 2005/0228663 A1* | 10/2005 | Boman | G10L 15/26 |
| | | | 704/235 |
| 2007/0195749 A1 | 8/2007 | Kakimoto | |
| 2008/0077410 A1 | 3/2008 | Ojala et al. | |
| 2008/0300871 A1* | 12/2008 | Gilbert | G10L 15/20 |
| | | | 704/233 |
| 2009/0171671 A1 | 7/2009 | Seo et al. | |
| 2015/0066502 A1* | 3/2015 | Achituv | G10L 15/07 |
| | | | 704/235 |
| 2015/0066503 A1* | 3/2015 | Achituv | G10L 15/26 |
| | | | 704/235 |
| 2015/0269949 A1* | 9/2015 | Chang | G10L 19/005 |
| | | | 704/201 |
| 2016/0078879 A1* | 3/2016 | Lu | G10L 25/81 |
| | | | 381/56 |
| 2016/0379638 A1* | 12/2016 | Basye | G10L 15/22 |
| | | | 704/235 |
| 2017/0018272 A1* | 1/2017 | Lee | H04N 21/4394 |
| 2018/0027123 A1* | 1/2018 | Cartwright | H04M 3/42221 |
| | | | 379/202.01 |
| 2018/0336902 A1* | 11/2018 | Cartwright | G06F 17/2785 |
| 2019/0058948 A1* | 2/2019 | Gupta | G06F 3/0482 |
| 2019/0108834 A1* | 4/2019 | Nelson | G10L 15/1815 |
| 2019/0172479 A1* | 6/2019 | Xiao | G06F 17/18 |
| 2019/0180771 A1* | 6/2019 | Yin | G10L 25/60 |
| 2019/0228763 A1* | 7/2019 | Czarnowski | G06N 3/04 |

FOREIGN PATENT DOCUMENTS

| | | |
|---|---|---|
| WO | 2013078614 | 6/2013 |
| WO | 2016196212 | 12/2016 |

OTHER PUBLICATIONS

Srinivasan, et al. "High-quality audio compression using an adaptive wavelet packet decomposition and psychoacoustic modeling." IEEE Transactions on Signal Processing 46.4, pp. 1085-1093 (1998).

Johnston. "Transform coding of audio signals using perceptual noise criteria." IEEE Journal on selected areas in communications 6.2 pp. 314-323 (1988).

Valin, et al. "A high-quality speech and audio codec with less than10-ms delay." IEEE transactions on audio, speech, and language processing 18.1, pp. 58-67 (2010).

Blamey "Adaptive dynamic range optimization (ADRO): a digital amplification strategy for hearing aids and cochlear implants." Trends in amplification 9.2, pp. 77-98 (2005).

Ngo, "Digital signal processing algorithms for noise reduction, dynamic range compression, and feedback cancellation in hearing aids". Diss. PhD thesis, ESAT, Katholieke Universiteit Leuven, Belgium, pp. 1-216 (2011).

* cited by examiner

PERFORMANCE SENSITIVE AUDIO SIGNAL SELECTION

TECHNICAL FIELD

The disclosed subject matter relates to selection of processed audio data, and, for example, to enabling access to processed audio data based on performance of the processed audio data in relation to one or more of input audio signal data, an audio processing metric, feedback from a received of the processed audio data, network conditions, etc., in real-time or near real-time communication via the network.

BACKGROUND

By way of brief background, conventional communication systems generally process audio signals to facilitate efficient transport across a network between user equipment devices. Processing of audio signals can convert an analog audio signal into a digital signal. Processing can further compress the digital audio signal according to a compression scheme. This can allow decompression at the receiving device to generate a version of the input audio signal. However, the version at the receiver can be a poor copy of the input audio signal. Processing of the input audio signal can result in artifacts in the reproduced version that affect the perceived quality of the reproduced version. As such, there are many processing schemes that are developed to improve the communication experience in specific circumstances while still providing network transport efficiencies. As an example, a voice processing scheme can perform well for voice in a quiet environment and can provide substantial network efficiency improvement. However, this same example voice processing can provide similarly good network efficiency improvements but can provide a poor user experience inasmuch as the reproduced version can have poor fidelity or intelligibility to the input audio signal. As such, it can be desirable to provide for selection of a processed audio signal based in part on fidelity to an input signal.

DETAILED DESCRIPTION

Figure 1:
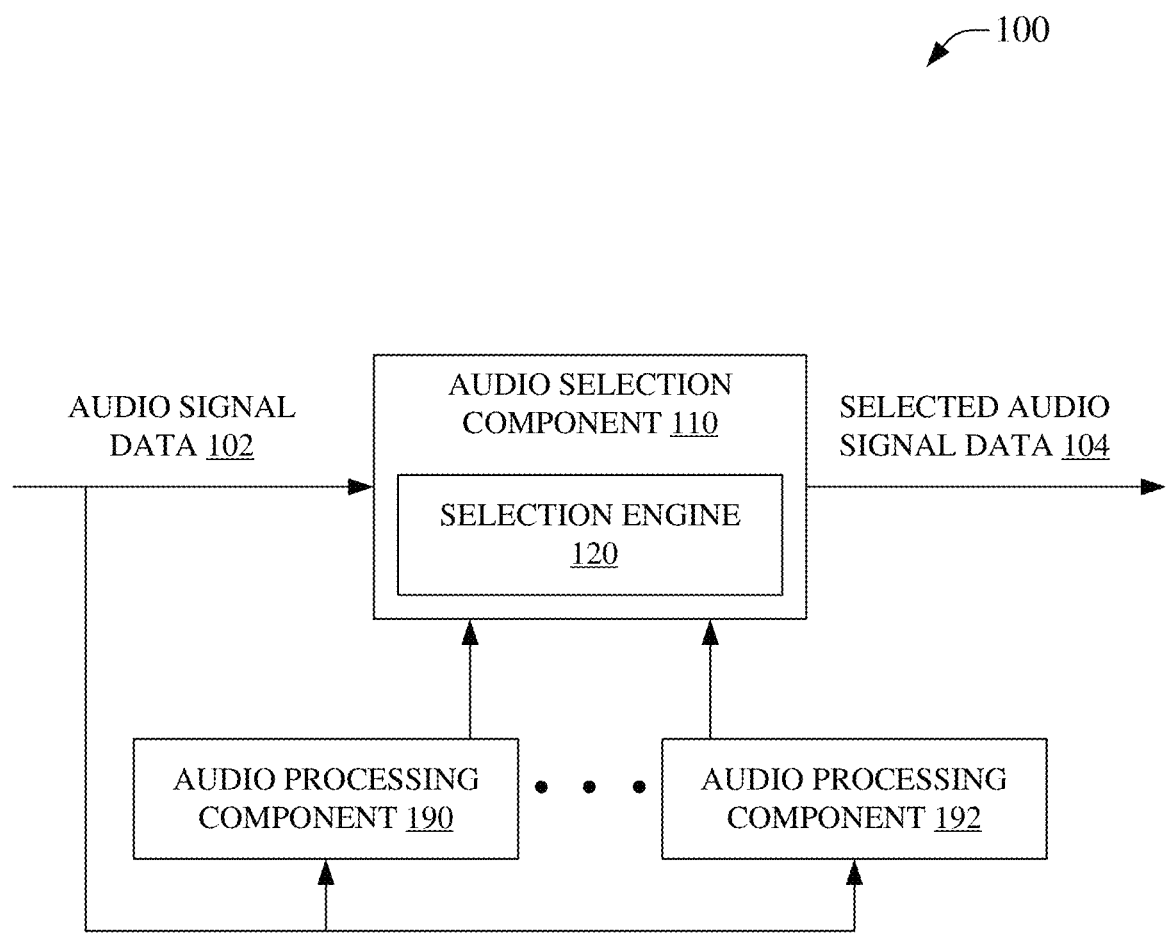
FIG. 1 is an illustration of an example system that can enable access to a selected audio signal, selected from at least one processed audio signal, based on incoming audio signal data for an incoming audio signal, in accordance with aspects of the subject disclosure.

The subject disclosure is now described with reference to the drawings, wherein like reference numerals are used to refer to like elements throughout. In the following description, for purposes of explanation, numerous specific details are set forth in order to provide a thorough understanding of the subject disclosure. It may be evident, however, that the subject disclosure may be practiced without these specific details. In other instances, well-known structures and devices are shown in block diagram form in order to facilitate describing the subject disclosure.

Conventional communication systems generally process audio signals to facilitate efficient transport across a network between user equipment devices (UEs). Processing of audio signals can include converting an analog audio signal into a digital signal comprising aspects of the analog audio signal. Processing can also comprise compressing a digital signal according to a compression scheme. Compression can allow for later decompression at the receiving device to generate a version of the input audio signal. Processing can comprise other aspects, e.g., companding, transcoding, etc., that can provide desired features in the resulting processed audio data. Processed audio data, e.g., an altered version of input audio data, can be received at a receiving device. The processed audio data can then be further processed to produce an output audio signal, e.g., a signal that can produce sound via a speaker, etc. However, the output audio signal can be a poor copy of the input audio signal as a result of the processing, communication network conditions, etc.

Fidelity of the input audio signal in the output audio signal as a result of processing of the input audio signal can be a result of artifacts introduced into processed audio data. These artifacts can affect the perceived quality of the output audio signal. In order to improve fidelity of the input audio signal in the output audio signal, different processing schemes have been developed. Typically these processing schemes work best for certain situations and strive to improve transportability of the processed audio data via a network while providing acceptable fidelity. As an example, a codec, such as Adaptive Multi-Rate (AMR or AMR-NB or GSM-AMR) audio codec, etc., can work well for vocal audio input. In fact, AMR is currently widely used to provide acceptable vocal audio signal processing that provides an acceptable level of fidelity but aims to reduce the bandwidth consumed by a network transporting the resulting AMR audio data. Notably, AMR is associated with a poor user experience, e.g., low fidelity, introduction of artifacts, etc., for non-vocal audio inputs, such as hold music, high background noise, etc. In this example, a voice processing scheme, e.g., AMR, can perform well for voice in a quiet environment and can provide for improved network efficiency over carrying lossless audio signal data, but can provide a poor user experience for non-voice, or voice in noisy environment, signals in order to provide similarly good network efficiency improvements. As such, it can be desirable to provide for selection of alternative processed audio signals based in part on a perceived quality of the output audio signal, e.g., higher fidelity, better noise reduction, better reproduction of different classes of audio inputs, such as voice, music, voice and music, environmental sounds, etc.

In an aspect, the disclosed subject matter provides for selecting a processed audio signal from different processing techniques. Selection of the processed audio signal can be based on received audio signal data, e.g., the input audio can be employed to rank different processed versions of the input audio. In an embodiment, the ranking can be based on metrics corresponding to a listening experience for an output audio signal generated from the processed audio data. As an example, a first processing scheme can generate first processed audio data and a different second processing scheme can generate second processed audio data.

The example first and second processed audio data can be ranked based on metrics corresponding to a listening experience of an output audio stream resulting from the first and second processed audio data, such as comparing a first fidelity of a first output corresponding to the first processed audio data to the input audio data and comparing a second fidelity of a second output corresponding to the second processed audio data to the input audio data, and ranking the first and second processed audio data based on the first and second fidelities. The listening experience for an output audio signal generated from the processed audio data can, as such, be based on fidelity, but can similarly be based on noise reduction, conformance to a user profile (such as amplifying some frequencies and damping other frequencies according to a listener profile), background noise reduction, etc. In some embodiments, listener feedback can be received, e.g., via a listener action, etc., to indicate information related to the listening experience of the output audio signal generated from the processed audio data. For example, a user can indicate that the output audio signal is good/bad, loud/quiet, noisy/clear, acceptable/unacceptable, etc. Further, the listener can indicate qualitative satisfaction with the listening experience, e.g., using a slider input in a user interface to indicate more/less satisfaction, selecting a number representing a level of satisfaction, etc. This satisfaction information can be employed in ranking a processed audio signal against other processed audio signals corresponding to an input audio signal. Numerous other listening experience data based rankings are readily appreciated and included within the instant disclosure despite not being expressly recited for the sake of clarity and brevity.

Moreover, a processed audio signal can be ranked against other processed audio signals corresponding to an input audio signal based on aspects other than the listening experience. This can facilitate selection of the processed audio signal based on the listening experience ranking and other rankings. In an embodiment, another ranking can be based on a processing scheme parameter(s), for example, a transcoding parameter. As an example, where transcoding by a first process is resource intensive, e.g., high processor usage, high memory consumption, etc., in comparison to transcoding by a second process, these example transcoding parameters can be employed in ranking the associated processed audio signals. Numerous other fidelity data based rankings are readily appreciated and included within the instant disclosure despite not being expressly recited for the sake of clarity and brevity.

Further, additional ranking can be performed based on an audio parameter. Audio parameters can correspond to the audio signal or related data. As an example, the disclosed subject matter can discern between different types of audio signal represented by audio signal data, such as classifying the instant audio signal as voice, voice and background/environmental noise, non-voice, music, music and voice, background/environmental sound, etc. These example classifications can be employed to rank processed audio signals. As an example, voice class audio signal data can result in improving a ranking of an AMR process relative to another process that is less optimized for voice. Similarly for example, instrumental music class audio signal data, such as some 'hold music' can result in decreasing a ranking of an AMR process that is more optimized for voice relative to the other process. In a further example, other audio signal data, e.g., sound level, signal-to-noise ratio, Gaussian noise, etc., can be employed to determine other rankings of the processed audio signal. Numerous other audio parameter data based rankings are readily appreciated and included within the instant disclosure despite not being expressly recited for the sake of clarity and brevity.

Still further ranking of the process audio signal can be based on a network condition, projected network condition, etc. Where a network for transporting processed audio signal data is subject to varying conditions, these conditions can be used in selecting processed audio signal data that may be best transported under the given network condition. As an example, were a network is busy (or is projected to become busy) higher compression of the audio signal can be preferable. In contrast, where a network is underutilized, a lower compression level can be tolerated better by the network. As such, all else being equal, a change in a network condition can give rise to selection of different processed audio signal data, for example, the most efficient compression is not always needed where a network can support a lower compression level for a given level of listener perceived quality and a given level of audio fidelity. Numerous other network condition data based rankings are readily appreciated and included within the instant disclosure despite not being expressly recited for the sake of clarity and brevity.

Moreover, a user equipment condition can be employed to further rank the processed audio signal data. A user equipment can, in an embodiment, have finite processing power, available memory, remaining battery/power, allocated bandwidth, data caps, etc., that can be considered to rank the processed audio signal data. As an example, a first processing scheme and a second processing scheme can be ranked according to UE power consumption relative to each processing scheme. Accordingly, these ranks can be different where the UE is drawing on a battery as compared to drawing on a mains power supply, e.g., the UE is 'plugged in'. Similarly, these ranks can be different based on a level of remaining battery power, e.g., a full batter can result in different rankings than a UE with, for example, 20% remaining battery life. Numerous other UE condition data based rankings are readily appreciated and included within the instant disclosure despite not being expressly recited for the sake of clarity and brevity.

Still further, user preferences can be employed to rank the processed audio signals. These user preferences can relate to a user profile associated with the sending UE. In an embodiment, a user can specify, via a user profile, a preference for certain processing aspects. As an example, where the user speaks a language that comprises vocal sounds that are known to generally compress better under certain processing schemes, for example 's' sounds, 'r' sounds, etc., a ranking based on corresponding user profile data can increase the ranking of the processing schemes known to work better for the user's spoken language. As another example, a user can indicate threshold levels, for example, a threshold fidelity level, a threshold data usage level, etc., so as to rank the available processed audio signals relative to the indicated thresholds. This can result in increasing a rank of a processing scheme that meets the threshold fidelity or uses less data than the threshold data usage level. Numerous other preference data based rankings are readily appreciated and included within the instant disclosure despite not being expressly recited for the sake of clarity and brevity.

In an embodiment, the ranking and selection of processed audio signal can occur once, for example at the beginning of an audio communication. However, the ranking and selection of processed audio signal can occur iteratively, for example at determined intervals in an audio communication, in response to trigger events during an audio communication, in real-time, in near real-time, etc. In an aspect, the trigger events can relate to a sending user input, a receiving user input, a network event, a UE condition, etc., or combinations thereof. As an example, activation of a 'hold' feature on a user equipment can trigger selection (or reselection) of a processed audio signal, for example where AMR is used for the voice portion of the commination session but the hold condition is known to be associated with instrumental music, the trigger can facilitate selection of a processed audio signal that is better suited to music data transmission. Numerous other example triggers are readily appreciated and included within the instant disclosure despite not being expressly recited for the sake of clarity and brevity.

To the accomplishment of the foregoing and related ends, the disclosed subject matter, then, comprises one or more of the features hereinafter more fully described. The following description and the annexed drawings set forth in detail certain illustrative aspects of the subject matter. However, these aspects are indicative of but a few of the various ways in which the principles of the subject matter can be employed. Other aspects, advantages, and novel features of the disclosed subject matter will become apparent from the following detailed description when considered in conjunction with the provided drawings.

FIG. 1 is an illustration of a system 100, that can enable access to a selected audio signal, selected from at least one processed audio signal, based on incoming audio signal data for an incoming audio signal, in accordance with aspects of the subject disclosure. System 100 can comprise audio selection component 110 that can determine selected audio signal data 104. Determining selected audio signal data 104 can be based on audio signal data 102. Audio signal data 102 can be received from a sending user equipment (SUE). In an aspect, audio signal data 102 can be compared to and processed audio signal data corresponding to processing of audio signal data 102 via audio processing component 190-192. Based on the comparison, the processed audio signal data from component 190-192 can be ranked based on a ranking rule determined by selection engine 120. Based on this rank, audio selection component 110 can determine selected audio signal data 104 that can be advanced to a receiving user equipment (RUE) via a network, e.g., communications framework 296, etc.

In an embodiment, audio signal data 102 can comprise voice signal information received from a microphone, e.g., a microphone of a SUE, etc. In some embodiments, audio signal data 102 can comprise voice signal information received from a prerecorded source, e.g., a voice prompt system, etc. Additionally, audio signal data 102 can comprise non-voice signal information received from a microphone or prerecorded source, such as, hold music (instrumental, voice and instrumental, etc.), environmental sounds such as the sound of running water, birdsong, etc., or other non-voice signals. Audio signal data 102 can be passed to processing components, including audio processing component 190-192, which can process audio signal data 102 according to one or more processing schemes. As an example, a first processing scheme can compress audio signal data 102 at a first rate and first quality while a second processing scheme can compress audio signal data 102 at a second rate and second quality. Audio signal data 102 can further be received by audio selection component 110.

In an embodiment, audio selection component 110 can comprise selection engine 120. Selection engine 120 can determine a selection rule. In some embodiments, selection engine 120 can determine a ranking rule facilitating selection by enabling ranking processed audio signal data corresponding to processing of audio signal data 102 via audio processing component(s) 190-192. In an aspect, ranking of the processed audio signal data can be based on fidelity of the associated processed audio signal(s) to an audio signal associated with audio signal data 102, e.g., a processed audio signal that has a first level of fidelity to the incoming audio signal audio signal data 102 can be ranked differently than another processed audio signal that has a different level of fidelity to the incoming audio signal embodied in audio signal data 102. Audio selection component 110 can determine selected audio signal data 104 based on the ranking.

In some embodiments, audio processing component(s) 190-192 can facilitate processing of different types/classes of audio signal data 102. In an aspect, audio processing component(s) 190-192 comprise an audio processing component that is generally preferable for voice audio signal data and an audio processing component that is generally preferable for non-voice signal data. This can enable system 100 to select processed audio signal data having better fidelity than conventional systems that typically are constrained to selecting for voice optimized compression. Moreover, in some embodiments, audio processing component(s) 190-192 can comprise companding processing schemes to reduce noise in compressed audio signals.

In some embodiments, the disclosed ranking and selection in system 100 can comprise additional ranking techniques. These additional ranking techniques can comprise ranking processed audio signal data according to other metrics. The other metrics can include indications from a RUE, SUE related user preferences, transcoding parameter(s), audio parameter(s), network condition data, SUE/RUE condition data, etc. As an example, a RUE can indicate that a received selected audio signal data 104 is unsatisfactory, which can decrement the ranking of the processed audio signal data. The resulting decrease in rank can result in selection of a different processed audio signal data. In another example, a SUE can indicate that a selected audio signal data 104 associated with a first processed audio signal data is using more SUE memory than a second processed audio signal data, which can decrement the ranking of the first processed audio signal data. The resulting decrease in rank can result in selection of another processed audio signal data based on the 'fidelity ranking' and the 'SUE ranking'. In some embodiments, different rankings according to different corresponding criteria for the processed audio signal data, corresponding to the available audio processing component(s) 190-192, can be separately determined for each criterion. The different rankings can be employed by audio selection component 110 to determine selected audio signal data 104 based on the different rankings. In other embodiments, the different criteria can be employed to alter a unified ranking of the processed audio signal data corresponding to the available audio processing component(s) 190-192 to enable determining selected audio signal data 104 by audio selection component 110.

Figure 2:
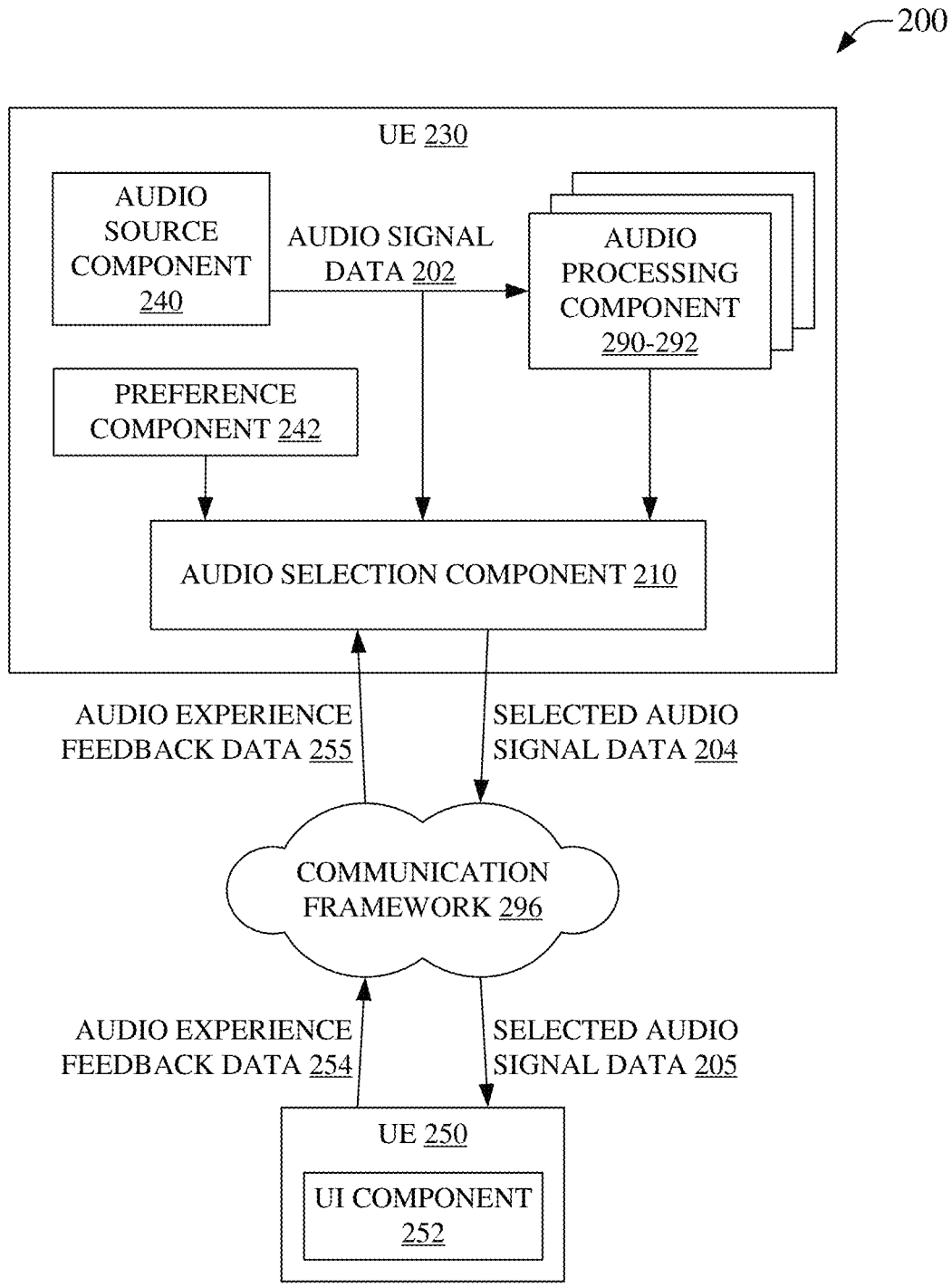
FIG. 2 is an illustration of an example system that can facilitate access to a selected audio signal, selected from at least one processed audio signal, based on incoming audio signal data for an incoming audio signal and an indication of selected audio signal performance from a user equipment receiving the selected audio signal, in accordance with aspects of the subject disclosure.

FIG. 2 is an illustration of a system 200, which can facilitate access to a selected audio signal, selected from at least one processed audio signal, based on incoming audio signal data for an incoming audio signal and an indication of selected audio signal performance from a user equipment receiving the selected audio signal, in accordance with aspects of the subject disclosure. System 200 can comprise UE 230 which can be a SUE. UE 230 can comprise audio source component 240. Audio source component 240 can be, for example, a microphone, data store having an audio file stored therein, etc. In an embodiment, UE 230 can also comprise audio processing component(s) 290-292. Audio processing component(s) 290-292 can receive audio signal data 202 from audio source component 240. Audio processing component(s) 290-292 can process audio signal data 202 into processed audio signal data comprising processed audio signals corresponding to the audio processing components of audio processing component(s) 290-292.

UE 230 can comprise, in an embodiment, preference component 242. Preference component 242 can enable access to preference information affiliated with a user of UE 230, e.g., via a user profile, etc. In an aspect, preference information can relate to ranking processed audio signals corresponding to the audio processing components of audio processing component(s) 290-292 according to a preference criterion. As an example, a user preference can be to preserve battery life, and accordingly, the processed audio signals corresponding to the audio processing components of audio processing component(s) 290-292 can be first ranked according to fidelity to audio signal data 202 by audio selection component 210 of UE 230, and can be second ranked according to battery consumption associated with processing the audio signals via audio processing component(s) 290-292. In an aspect, audio selection component 210 can then select a processed audio signal based on the first ranking and the second ranking, resulting in selected audio signal data 204.

Selected audio signal data 204 can be communicated, via communication framework 296, e.g., network comprising a wired or wireless link, etc. In an aspect, communication framework 296 can pass selected audio signal data 204 unchanged as selected audio signal data 205. However, in some embodiments, selected audio signal data 204 can be altered during traversal of communication framework 296, resulting in selected audio signal data 205 being different than selected audio signal data 204. However, how the alteration of selected audio signal data 204 into selected audio signal data 205 occurs while in transit across communication framework 296 is generally beyond the scope of the disclosed subject matter and is included here only to illustrate that selected audio signal data 205 can be the same as or different from selected audio signal data 204. Accordingly, UE 250, which can be a RUE, can receive selected audio signal data 205.

UE 250 can comprise user interface (UI) component 252 that can facilitate generating audio experience feedback data 254. In an embodiment, a user of UE 250 can indicate, via UI component 252, an indicator corresponding to experiencing selected audio signal data 205 via UE 250. As an example, UI 250 can receive input indicating a level of satisfaction, indications of deficiencies in the audio experience, etc. that can be communicated back to audio selection component 210 via communication framework 296, e.g., via audio experience feedback data 254/255. Similar to selected audio signal data 204/205, audio experience feedback data 254 can, in some instances be altered by communication framework 296 and, as such, audio experience feedback data 255 can be the same as, or different from, audio experience feedback data 254, although both communicate an indication corresponding to the audio experience at UE 250.

In response to receiving audio experience feedback data 255, audio selection component 210 can alter a ranking of selected audio signal data 204 relative to other available processed audio signal data, e.g., a 'feedback ranking'. This feedback ranking can be employed by audio selection component 210, e.g., in combination with the fidelity ranking and the preference ranking, to determine selection of an available processed audio signal data, which can result in employing a different processed audio signal data as selected audio signal data 204 in response to receiving audio experience feedback data 255.

Figure 3:
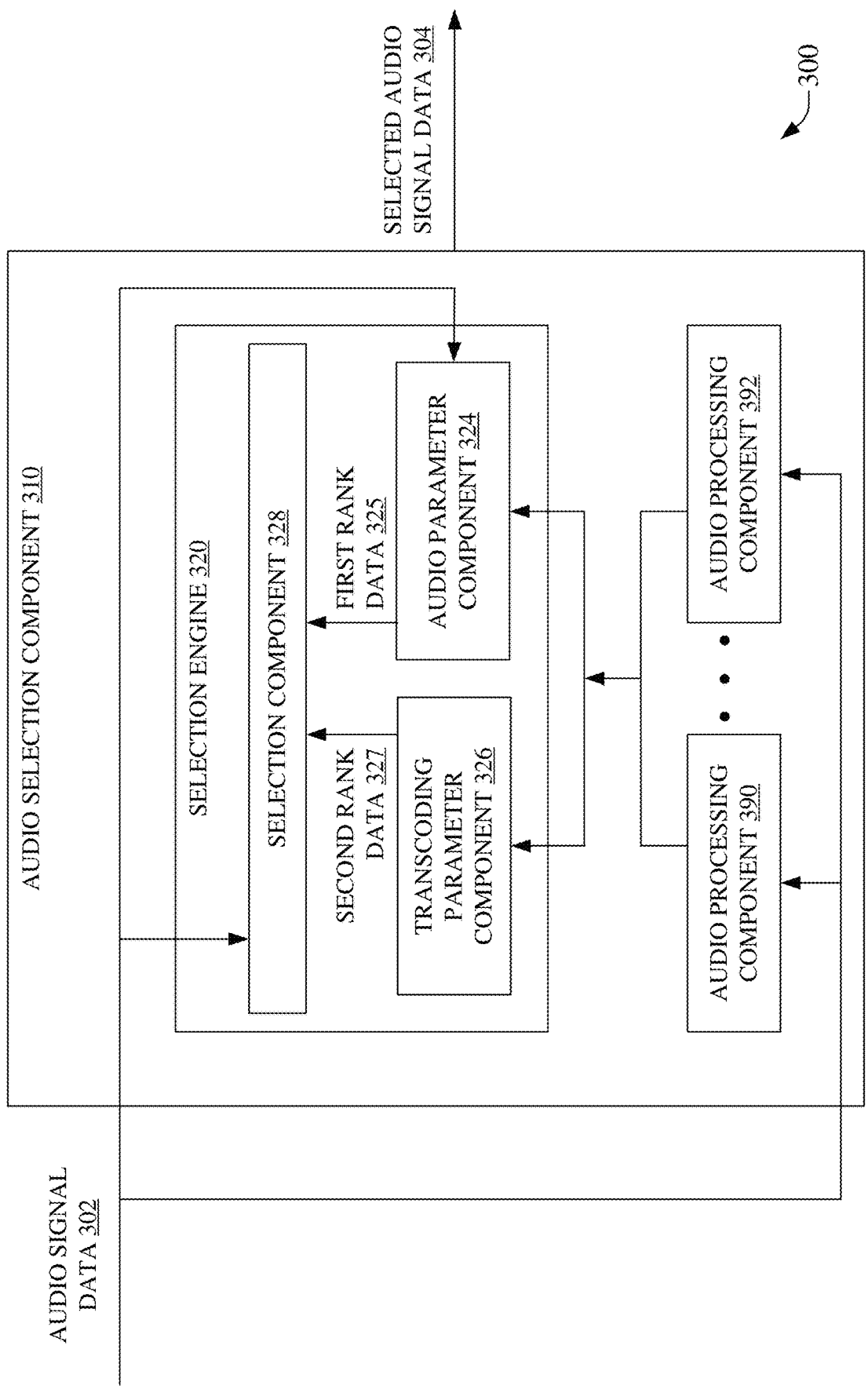
FIG. 3 is an illustration of an example system that can enable access to a selected audio signal, selected from at least one processed audio signal, based on incoming audio signal data for an incoming audio signal and a transcoding parameter corresponding to the at least one processed audio signal, in accordance with aspects of the subject disclosure.

FIG. 3 is an illustration of a system 300 that can enable access to a selected audio signal, selected from at least one processed audio signal, based on incoming audio signal data for an incoming audio signal and a transcoding parameter corresponding to the at least one processed audio signal, in accordance with aspects of the subject disclosure. System 300 can comprise audio selection component 310. Audio selection component 310 can comprise audio processing component(s) 390-292. Audio processing component(s) 390-392 can receive audio signal data 302 from an audio source. Audio processing component(s) 390-392 can process audio signal data 302 into processed audio signal data comprising processed audio signals corresponding to the audio processing components of audio processing component(s) 390-392.

Audio selection component 310 can comprise selection engine 320 that can determine a ranking rule. The ranking rule can enable selection component 328 to determine selected audio signal data 304 based on rankings of processed audio signal data according to at least one corresponding criterion. In an embodiment, selection engine 320 can comprise audio parameter component 324 that can determine first rank data 325 based on audio signal data 302 and processed audio signals corresponding to the audio processing components of audio processing component(s) 390-392, e.g., a 'fidelity' ranking according to a level of fidelity between the input audio and the processed audio. In an embodiment, selection engine 320 can comprise transcoding parameter component 326 that can determine second rank data 327 based on a transcoding parameter of each of the processed audio signals corresponding to the audio processing components of audio processing component(s) 390-392, e.g., a 'transcode' ranking according to the determined transcoding parameter, for example, a size reduction of the audio packets from the input audio to the processed audio, a speed of transcoding, an error rate, a quantization error rate, etc., associated with the transcoding by the corresponding audio processing component(s) 390-392. Accordingly, selection component 328 can determine selected audio signal data 304 based on the first rank data 325 and second rank data 327. In an aspect, other rank data, as disclosed elsewhere herein can further be employed by selection component 328 in determining selected audio signal data 304. Moreover, system 300 can further perform determining selected audio signal data 304 at determined intervals, in response to trigger events, in real-time, in near real-time, etc. As an example, a level of a transcoding parameter can change, for example where the character of audio signal data 302 changes, etc., which can result in transcoding parameter component 326 altering second rank data 327, which can result in selection component 328 updating the determining od selected audio signal data 304.

Figure 4:
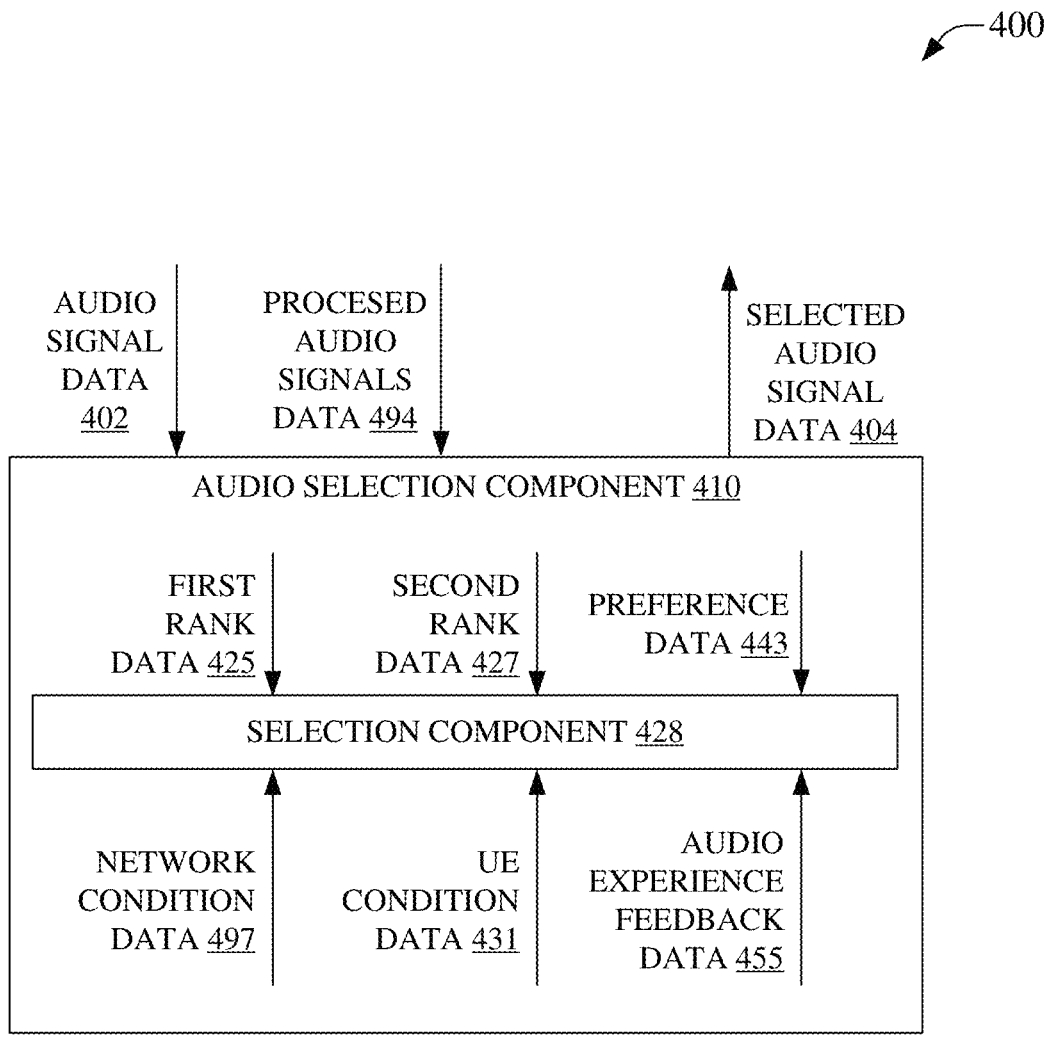
FIG. 4 illustrates an example system that can facilitate access to a selected audio signal, selected from at least one processed audio signal, based on one or more of an incoming audio signal data for an incoming audio signal, an indication of selected audio signal performance from a user equipment receiving the selected audio signal, a network condition for a network transporting the selected audio signal, a user equipment condition for a user equipment sending selected audio signal data corresponding to the selected audio signal, and a transcoding parameter corresponding to the at least one processed audio signal, in accordance with aspects of the subject disclosure.

FIG. 4 is an illustration of a system 400, which can facilitate access to a selected audio signal, selected from at least one processed audio signal, based on one or more of an incoming audio signal data for an incoming audio signal, an indication of selected audio signal performance from a user equipment receiving the selected audio signal, a network condition for a network transporting the selected audio signal, a user equipment condition for a user equipment sending selected audio signal data corresponding to the selected audio signal, and a transcoding parameter corresponding to the at least one processed audio signal, in accordance with aspects of the subject disclosure. System 400 can comprise audio selection component 410 that can select a processed audio signal based one or more rankings of processed audio signals, e.g., comprised in and received via processed audio signals data 494, resulting in selected audio signal data 404. Audio selection component 410 can comprise selection component 426, which can apply one or more ranking rules to determine selected audio signal data 404 based on rankings of processed audio signal data according to at least one corresponding criterion. In an aspect, processed audio signals can be processed according to audio processing schema applied by audio processing component(s), e.g., 190-192, 290-292, 390-392, etc.

In an embodiment, selection component 426 can receive determined rankings and can accordingly determine selected audio signal data 404 based on the received determined rankings. The determined rankings can comprise first rank data 425, which can be a fidelity ranking that ranks available processed audio signals according to their level of fidelity to an input audio signal comprised in audio signal data 402. In an aspect, this can enable ranking by how well the corresponding processed audio signal represents the input audio signal. In an aspect, first rank data 425 can include ranking according to types or classes of audio data. In this regard, available processed audio signals that are demonstrated to perform processing of a determined type/class of audio better than other types/classes can have their rank altered based on their affinity for the type/class of audio represented in audio signal data 402. As an example, a transcoding by a transcoder known to perform well with speech audio can be ranked differently than a transcoding from a transcoder known to perform poorly with speech audio.

In an embodiment, determined rankings can comprise second rank data 427, which can be a transcoding parameter ranking that ranks available processed audio signals according to a transcoding parameter. In an aspect, this can enable ranking according to a performance of transcoding used to generate the corresponding processed audio signal.

In some embodiments, determined rankings can comprise preference data 443 that can be used to determine a preference ranking. A preference ranking can embody sorting/ranking of the available processed audio signals according to an indication of a user preference, e.g., via a user profile, etc., typically affiliated with an SUE. In an aspect, this can enable ranking according to a sender preferences, such as preference related to a processing schema's impact on the SUE performance, etc. It will be noted that this can be different from data related to the SUE itself and can generally be associated with how resource intensive a processing schema can be in a particular operating environment.

In an embodiment, determined rankings can comprise audio experience feedback data 455 that can be used to determine a feedback ranking. A feedback ranking can facilitate ranking of the available processed audio signals according to an indication of a user experience with output audio, e.g., via a user interface, etc., typically affiliated with a RUE. In an aspect, the feedback rating can indicate adjusting an ordering/sorting/ranking of a selected audio signal already received and employed by a RUE to enable updating or adapting the determined selected audio signal data 404 for current or future communication to the RUE, e.g., a feedback loop.

In some embodiments, determined rankings can comprise UE condition data 431 that can be used to determine a device condition ranking. A device condition ranking can embody ordering/sorting/ranking of the available processed audio signals according to a condition of a device, e.g., a SUE. As an example, where a SUE processor is more burdened with other processes in execution, the device condition ranking can alter the ranking of available processed audio signals to correspondingly promote less resource intensive processing. Similarly, in another example, where a SUE processor is less burdened with other processes in execution, the device condition ranking can alter the ranking of available processed audio signals to correspondingly promote more resource intensive processing. In an further example, where a SUE is affiliated with a limited bandwidth connection to a communication framework, e.g., weak signal strength, wireless interference, contractual limitations to available networks, etc., the device condition ranking can alter the ranking of available processed audio signals to correspondingly promote better error correcting processing, higher compression processing, etc.

In an embodiment, determined rankings can comprise network condition data 497 that can be used to determine a network condition ranking. A network condition ranking can embody ordering/sorting/ranking of the available processed audio signals according to a condition of a network, or part thereof, for transporting selected audio signal data 404 between a SUE and a RUE. In an aspect, conditions of the network can relate to an ability to transport more or less data in a more or less reliable manner. As such, the network condition ranking can reflect network conditions to allow the SUE to determine selected audio signal data 404 that can be more germane to indicated network conditions. As an example, where a network is underutilized, higher bandwidth audio signals can be accommodated and the available processed audio signals can be ranked to capitalize on the networks underutilization. Similarly, for example, where a network is highly congested, network condition ranking can promote more aggressive compression such that selected audio signal data 404 can consume less bandwidth on the congested network.

In an aspect, the several rankings can then be employed by selection component 426 to determine selected audio signal data 404. As an example, a concert goer can be holding their cellphone, the SUE, aloft at a rock concert so that their friends in another city can hear the show on their cellphone, the RUE, in speakerphone mode. The SUE can be at 85% battery life and be an older cellphone with an older and slower processor than the current RUE cellphone. Due to the density of mobile devices at the rock concert, the cellular network can be congested near the SUE. Moreover, the SUE user can have indicated, via a user profile, a preference for sending the highest quality audio. Accordingly, in this example, preference data 443, indicating highest quality audio is preferred can rank the available processing schema to highly rank the best audio quality. Further, UE condition data 431 can be used to, based on the 85% battery life, separately rank the available processing schema to favor moderate battery consumption processing. Additionally, network condition data 497 can be used to, based on the congestion of the network near the SUE, favor higher compression processing schema. Based on these aspects, selection component 426 can tentatively select some of the available processing schema. Of these tentatively selected available processing schema, first rank 425 can rank audio data processed via the tentatively selected available processing schema based on the rock music received via the SUE microphone and can indicate the best fidelity. Additionally, the performance of the tentatively selected available processing schema in processing the rock music can be used to rank the tentatively selected available processing schema according to their performance. Based on the fidelity and performance of the tentatively selected available processing schema, selected audio signal data 404 can be determined by selection component 426 to enable sending correspondingly processed audio signals to the RUE via the network. The friends can then indicate, via the RUE user interface, aspects of the audio experience, e.g., clipping, background noise being excessive, etc., which audio experience feedback data 455 can be employed by selection component 426, in conjunction to any other changes in the other rankings, e.g., 425, 427, 443, 497, 431, etc., to determine selected audio signal data 404 in, or nearly in, real-time. This example illustrates that many different facets of audio signal communication can be ranked and the rankings can be employed, according to a ranking rule(s) by selection component 426, to meet many demands of communicating preferred audio signal data. It will be noted that in this example, a voice compression schema, such as AMR or the like, can be less likely to be selected as a non-speech compression schema as a result of likely demonstrating poor fidelity, not matching a type/class as well as a non-speech schema, based on audio experience feedback data 455 indicating that when AMR is used it doesn't provide a satisfactory experience, etc.

In view of the example system(s) described above, example method(s) that can be implemented in accordance with the disclosed subject matter can be better appreciated with reference to flowcharts in FIG. 5-FIG. 8. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methods. Furthermore, not all illustrated acts may be required to implement a described example method in accordance with the subject specification. Further yet, two or more of the disclosed example methods can be implemented in combination with each other, to accomplish one or more aspects herein described. It should be further appreciated that the example methods disclosed throughout the subject specification are capable of being stored on an article of manufacture (e.g., a computer-readable medium) to allow transporting and transferring such methods to computers for execution, and thus implementation, by a processor or for storage in a memory.

Figure 5:
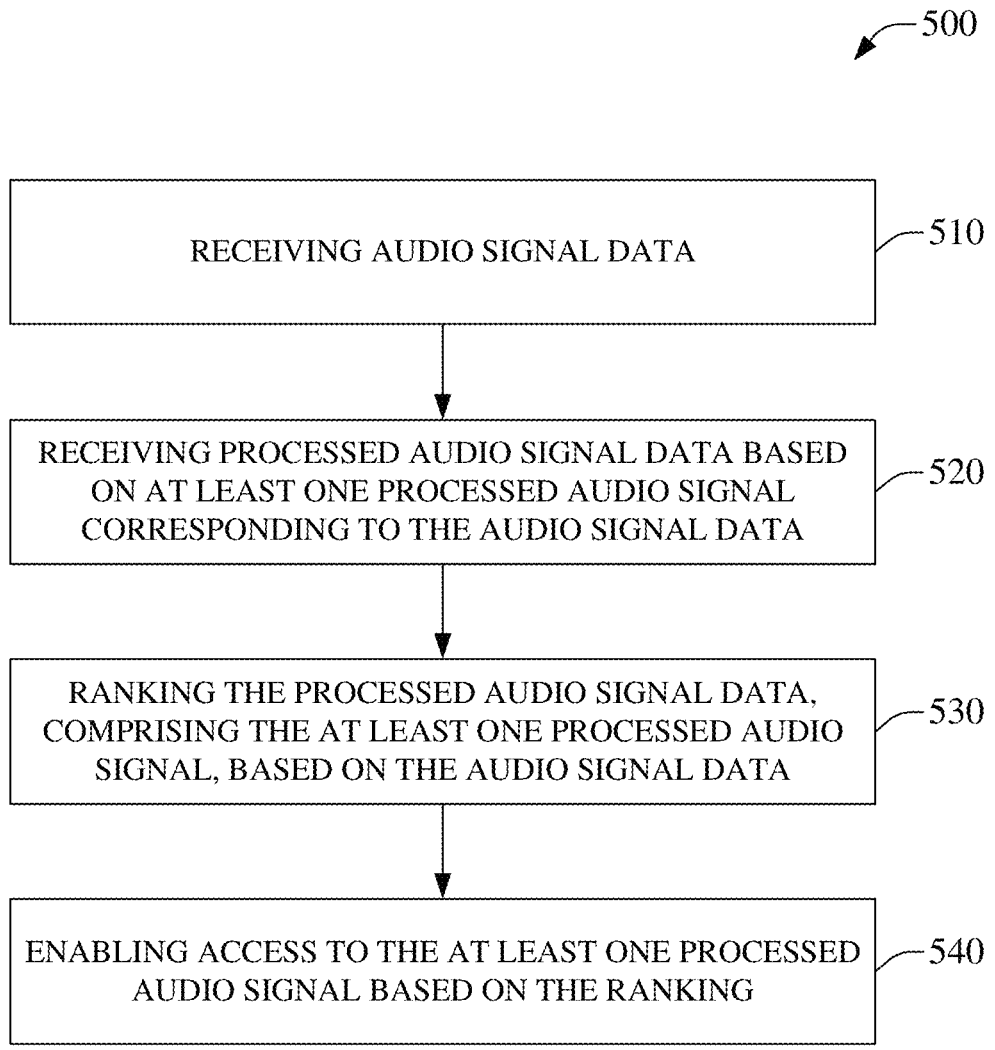
FIG. 5 is an illustration of an example method facilitating access to a processed audio signal, wherein the processed audio signal is selected from processed audio signals comprising at least the processed audio signal, based on a ranking of the processed audio signals, wherein the ranking is determined from at least audio signal data corresponding to the processed audio signal, in accordance with aspects of the subject disclosure.

FIG. 5 is an illustration of an example method 500, facilitating access to a processed audio signal, wherein the processed audio signal is selected from processed audio signals comprising at least the processed audio signal, based on a ranking of the processed audio signals, wherein the ranking is determined from at least audio signal data corresponding to the processed audio signal, in accordance with aspects of the subject disclosure. At 510, method 500 can comprise receiving audio signal data. Audio signal data can represent an input audio signal. The input audio signal can comprise speech audio and non-speech audio. In an aspect, the audio signal can comprise environmental sounds or noise captured in conjunction with the intended audio input, for example an audio signal from a use equipment while driving can comprise speech and traffic sounds. In a further aspect, the input audio signal can be recorded or live audio, for example hold music, etc.

At 520, method 500 can comprise receiving processed audio signal data based on at least one processed audio signal corresponding to the audio signal data. Generally, in order to improve fidelity of the input audio signal at the output audio signal, different processing schemes have been developed. These different processing schemes can be applied to the input audio signal to generate a corresponding number of processed audio signals that can be comprised in the processed audio signal data. Moreover, a processing scheme can be performed with different parameters. In general, these can be treated as different processing schemes because of the different parameters selected, even though the processing schemes may be of the same type.

At 530, method 500 can comprise ranking the processed audio signal data. In effect, the different processed audio signals comprising the processed audio signal data can be ranked against each other based on a metric. At 530, the metric can be comparison to the audio signal data. As such, the level of similarity between a process audio signal and the input audio signal can be used to rank the at least on processed audio signal comprised in the audio signal data. In an embodiment, this can represent ranking the processed version(s) of the input audio signal by a level of fidelity to the input audio signal.

Method 500, at 540, can enable access to the at least one processed audio signal based on the ranking. At this point, method 500 can end. Where, for example, the ranking is based on a level of fidelity for a processing audio signal of the processed audio signal data to the input studio signal of the audio signal data received at 510, the ranking can enable selection of a process audio signal based on the corresponding level of fidelity to the input audio signal. Generally, higher fidelity is preferable, all else being equivalent, so it can be viewed that the better the fidelity the more preferential the ranking and the higher likelihood that the best fidelity processed audio signal can be determined to be selected from the processed audio signal data. In some embodiments, additional rankings by other criteria can be employed in the determining the selection of the processed audio signal to enable access to that at least one processed audio signal.

Figure 6:
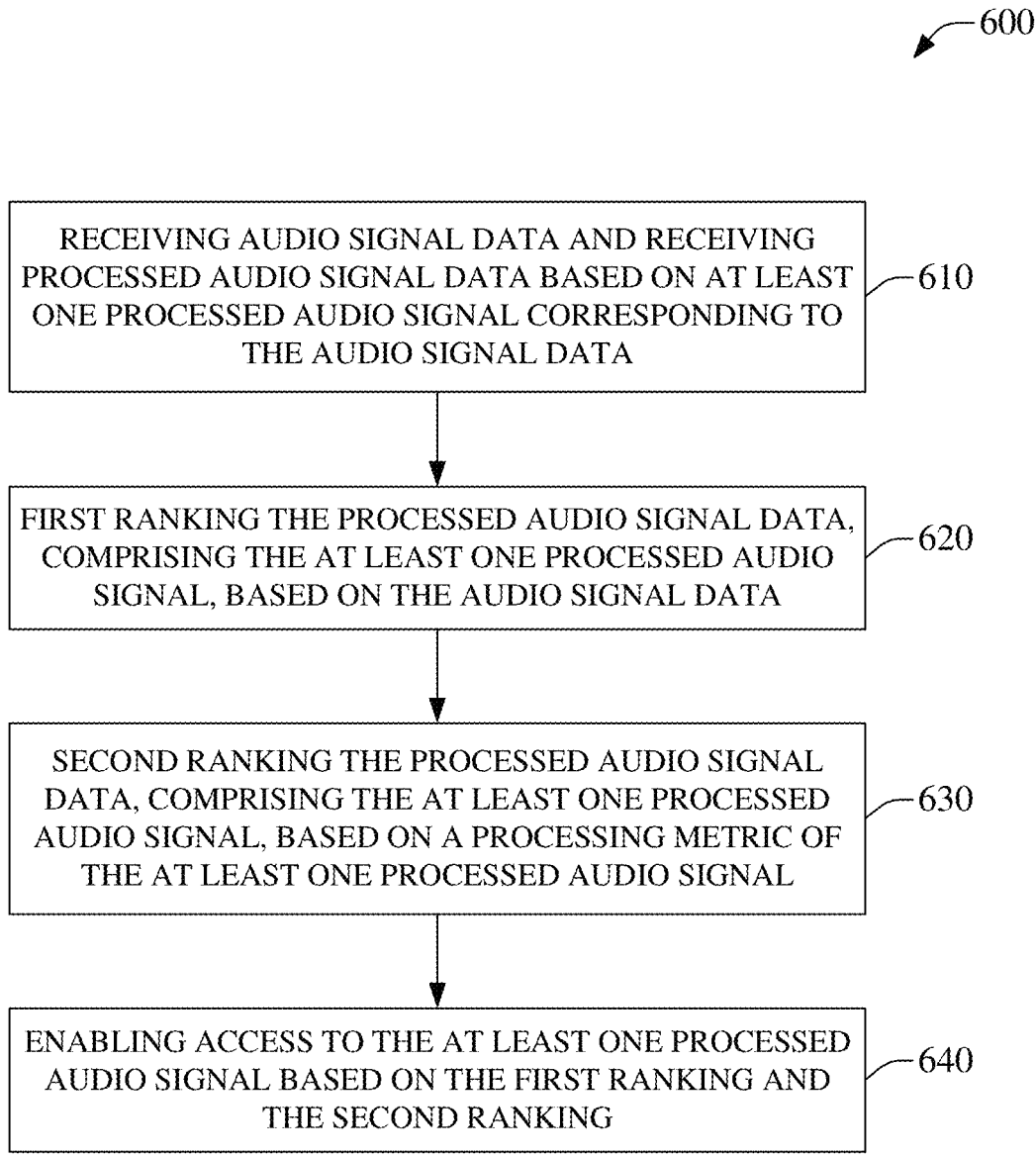
FIG. 6 is an illustration of an example method enabling access to a processed audio signal, wherein the processed audio signal is selected from processed audio signals comprising at least the processed audio signal, based on a first ranking and a second ranking of the processed audio signals, wherein the first ranking is determined from at least audio signal data corresponding to the processed audio signal, and wherein the second ranking is determined from a processing metric corresponding to processing resulting in the processed audio signal, in accordance with aspects of the subject disclosure.

FIG. 6 is an illustration of an example method 600, which can enable access to a processed audio signal, wherein the processed audio signal is selected from processed audio signals comprising at least the processed audio signal, based on a first ranking and a second ranking of the processed audio signals, wherein the first ranking is determined from at least audio signal data corresponding to the processed audio signal, and wherein the second ranking is determined from a processing metric corresponding to processing resulting in the processed audio signal, in accordance with aspects of the subject disclosure. At 610, method 600 can comprise receiving audio signal data. Audio signal data can represent an input audio signal. The input audio signal can comprise speech audio, non-speech audio, recorded audio, live audio, or combinations thereof. At 610, at least one processed version of the input audio signal can also be received. This processed version of the input audio signal can be comprised in processed audio signal data. In an aspect, processed audio signal data can comprise more than one processed audio signal based on a correspondingly different processing of the input audio embodied in the input audio signal data.

At 620, method 600 can comprise first ranking the processed audio signals comprising the processed audio signal data. The first ranking can be based on the audio signal data. As an example, the first ranking can rank the processed audio signals of the processed audio signal data based on a corresponding level of fidelity to the an input audio signal comprised on the received audio signal data. Typically, different processing schemes can be expected to generate different levels of fidelity for to the same input. As a result, the ranking can order, sort, etc., the processed version of the input.

At 630, method 600 can comprise second ranking the processed audio signals of the processed audio signal data. The second ranking can be based on a processing metric corresponding to the processing schema used to generate the processed audio signals of the processed audio signal data. Whereas not all processing schemes perform the same operations, not only can they be associated with different levels of fidelity, they can also be associated with correspondingly different performance metrics. As examples, some processing schema can be more computing resource intensive than other processing schema, some more memory intensive, some faster or slower, some with better error correction, etc. The second ranking can therefore sort, order, etc., the processed audio signals of the processed audio signal data by a determined processing metric. This can allow use of the second ranking to favor selection of a metric, for example selecting a processed audio signal associated with a high/low/moderate power consumption, fast/slow speed, etc.

Method 600, at 640, can enable access to the at least one processed audio signal based on the first ranking and the second ranking. At this point, method 600 can end. Method 600 enables the use of multiple rankings to select a processed audio signal. In an aspect, this can enable selection based on coordination between the two illustrated rankings. As an example, a processed audio signal can be selected that is moderate in fidelity and moderate in processor use rather than another processed audio signal that is higher fidelity and more demanding of the processor. The coordination of indicating the processed audio signal to be accessed can be based on a ranking rule and can reflect an overall selection goal.

Figure 7:
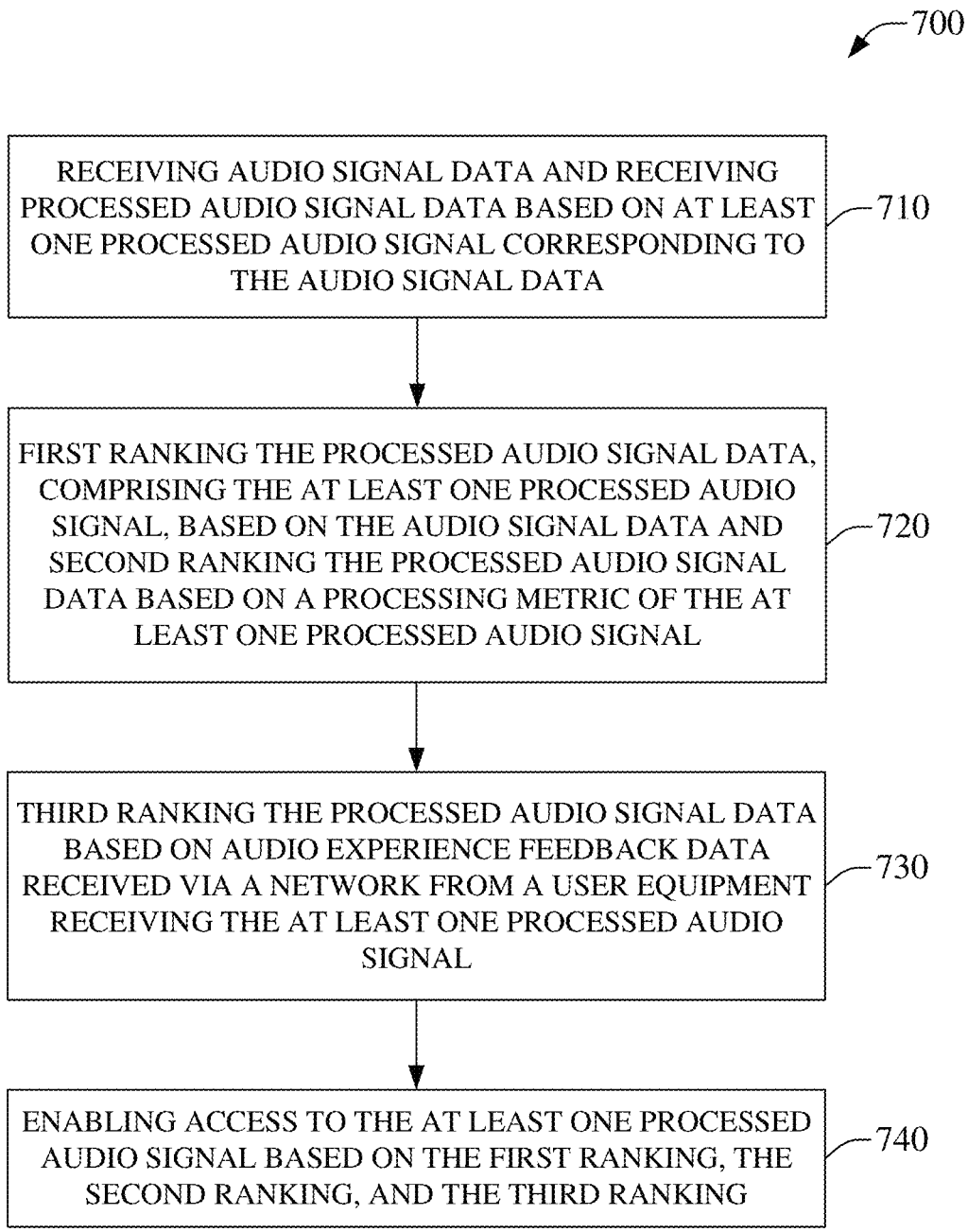
FIG. 7 illustrates an example method enabling access to a processed audio signal, wherein the processed audio signal is selected from processed audio signals comprising at least the processed audio signal, based on a first ranking, a second ranking, and a third ranking of the processed audio signals, wherein the first ranking is determined from at least audio signal data corresponding to the processed audio signal, wherein the second ranking is determined from a processing metric corresponding to processing resulting in the processed audio signal, and wherein the third ranking is determined from audio experience feedback data for a user equipment receiving the processed audio signal, in accordance with aspects of the subject disclosure.

FIG. 7 illustrates example method 700 that facilitates access to a processed audio signal, wherein the processed audio signal is selected from processed audio signals comprising at least the processed audio signal, based on a first ranking, a second ranking, and a third ranking of the processed audio signals, wherein the first ranking is determined from at least audio signal data corresponding to the processed audio signal, wherein the second ranking is determined from a processing metric corresponding to processing resulting in the processed audio signal, and wherein the third ranking is determined from audio experience feedback data for a user equipment receiving the processed audio signal, in accordance with aspects of the subject disclosure. Method 700, at 710, can comprise receiving audio signal data and at least one processed version of the input audio signal as is represented by the audio signal data. The input audio signal can comprise speech audio, non-speech audio, recorded audio, live audio, or combinations thereof. The at least one processed version of the input audio signal can be comprised in processed audio signal data. In an aspect, processed audio signal data can comprise more than one processed audio signal based on a correspondingly different processing of the input audio embodied in the input audio signal data.

At 720, method 700 can comprise first ranking and second ranking the processed audio signals comprising the processed audio signal data. The first ranking can be based on the audio signal data. As an example, the first ranking can rank the processed audio signals of the processed audio signal data based on a corresponding level of fidelity to the an input audio signal comprised on the received audio signal data. Typically, different processing schemes can be expected to generate different levels of fidelity for to the same input. As a result, the ranking can order, sort, etc., the processed version of the input. The second ranking can be based on a processing metric corresponding to the processing schema used to generate the processed audio signals of the processed audio signal data. Whereas not all processing schemes perform the same operations, not only can they be associated with different levels of fidelity, they can also be associated with correspondingly different performance metrics. The second ranking can therefore sort, order, etc., the processed audio signals of the processed audio signal data by a determined processing metric.

At 730, method 700 can comprise third ranking the processed audio signals of the processed audio signal data. The third ranking can be based on audio experience feedback data. The audio experience feedback data can be received, via a network, from a UE performing a previously selected processed audio signal data. In an embodiment, method 700 can provide a feedback based on the performance of an in-use process audio signal data so that the method can rank the in-use processed audio signal data against other processed audio signal data. In an aspect, where the audio experience feedback data indicates a favorable experience, a rank of that processed audio signal can be improved and where the audio experience feedback data indicates an unfavorable experience, a rank of that processed audio signal can be eroded. Accordingly, in an iterative loop, as a processed audio signal receives audio experience feedback data from the recipient UE, e.g., via a user interface, this can result in selection of another processed audio signal that can subsequently receive audio experience feedback data. As this loop continues, the feedback can converge on a ranking of the audio experience at the receiving UE based on the audio experience feedback data provided iteratively. In some embodiments, historical audio experience feedback data can be employed in determining the third ranking. In some embodiments, predictive audio experience feedback data can be employed in determining the third ranking.

Method 700, at 740, can enable access to the at least one processed audio signal based on the first ranking, the second ranking, and the third ranking. At this point, method 700 can end. Method 700 enables the use of multiple rankings to select a processed audio signal. In an aspect, this can enable selection based on coordination between the three illustrated rankings. As an example, a processed audio signal can be initially selected based on, for example, moderate fidelity and moderate in processor use. The third ranking can be employed in conjunction with the first ranking and the second ranking to adjust which processed audio signal is accessed. Continuing the example, the initially selected processed audio signal can result in audio experience feedback data indicating that it has satisfactory performance at the receiving UE. Accordingly, the third ranking can be affected, for example decreasing the ranking to cause selection of another processed audio signal having lower fidelity but correspondingly lower processor demand. Where the other processed audio signal receives audio experience feedback data indicating unsatisfactory performance at the receiving UE, the third ranking can be again adjusted and, over several iterations, the combination of the first, second, and third rankings can, for example, result in selection of a processed audio signal associated with a lowest processor demand and lowest fidelity while still receiving audio experience feedback data indicating satisfactory performance.

Figure 8:
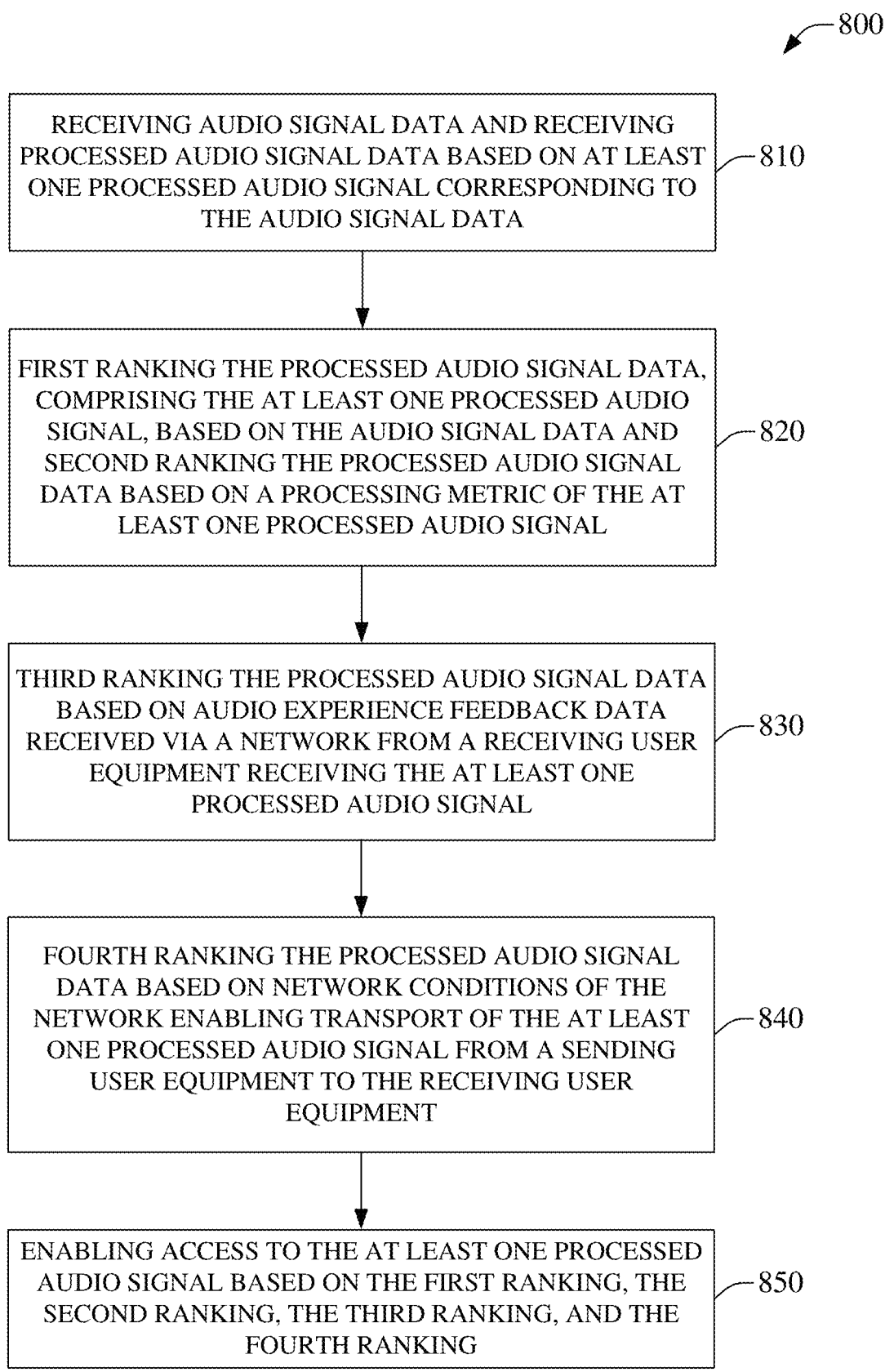
FIG. 8 illustrates an example method enabling access to a processed audio signal, wherein the processed audio signal is selected from processed audio signals comprising at least the processed audio signal, based on a first ranking, a second ranking, a third ranking, and a fourth ranking of the processed audio signals, wherein the first ranking is determined from at least audio signal data corresponding to the processed audio signal, wherein the second ranking is determined from a processing metric corresponding to processing resulting in the processed audio signal, wherein the third ranking is determined from audio experience feedback data for a receiving user equipment receiving the processed audio signal, and wherein the fourth ranking is determined from a network condition of a network transporting the processed audio signal data between a sending user equipment and the receiving user equipment, in accordance with aspects of the subject disclosure.

FIG. 8 illustrates example method 800, which can enable access to a processed audio signal, wherein the processed audio signal is selected from processed audio signals comprising at least the processed audio signal, based on a first ranking, a second ranking, a third ranking, and a fourth ranking of the processed audio signals, wherein the first ranking is determined from at least audio signal data corresponding to the processed audio signal, wherein the second ranking is determined from a processing metric corresponding to processing resulting in the processed audio signal, wherein the third ranking is determined from audio experience feedback data for a receiving user equipment receiving the processed audio signal, and wherein the fourth ranking is determined from a network condition of a network transporting the processed audio signal data between a sending user equipment and the receiving user equipment, in accordance with aspects of the subject disclosure. Method 800, at 810, can comprise receiving audio signal data and at least one processed version of the input audio signal as is represented by the audio signal data. The input audio signal can comprise speech audio, non-speech audio, recorded audio, live audio, or combinations thereof. The at least one processed version of the input audio signal can be comprised in processed audio signal data. In an aspect, processed audio signal data can comprise more than one processed audio signal based on a correspondingly different processing of the input audio embodied in the input audio signal data.

At 820, method 800 can comprise first ranking and second ranking the processed audio signals comprising the processed audio signal data. The first ranking can be based on the audio signal data. As an example, the first ranking can rank the processed audio signals of the processed audio signal data based on a corresponding level of fidelity to the an input audio signal comprised on the received audio signal data. Typically, different processing schemes can be expected to generate different levels of fidelity for to the same input. As a result, the ranking can order, sort, etc., the processed version of the input. The second ranking can be based on a processing metric corresponding to the processing schema used to generate the processed audio signals of the processed audio signal data. Whereas not all processing schemes perform the same operations, not only can they be associated with different levels of fidelity, they can also be associated with correspondingly different performance metrics. The second ranking can therefore sort, order, etc., the processed audio signals of the processed audio signal data by a determined processing metric.

At 830, method 800 can comprise third ranking the processed audio signals of the processed audio signal data. The third ranking can be based on audio experience feedback data. The audio experience feedback data can be received, via a network, from a UE performing a previously selected processed audio signal data. In an embodiment, method 800 can provide a feedback based on the performance of an in-use process audio signal data so that the method can rank the in-use processed audio signal data against other processed audio signal data. In an aspect, where the audio experience feedback data indicates a favorable experience, a rank of that processed audio signal can be improved and where the audio experience feedback data indicates an unfavorable experience, a rank of that processed audio signal can be eroded. Accordingly, in an iterative loop, as a processed audio signal receives audio experience feedback data from the recipient UE, e.g., via a user interface, this can result in selection of another processed audio signal that can subsequently receive audio experience feedback data. As this loop continues, the feedback can converge on a ranking of the audio experience at the receiving UE based on the audio experience feedback data provided iteratively. In some embodiments, historical audio experience feedback data can be employed in determining the third ranking. In some embodiments, predictive audio experience feedback data can be employed in determining the third ranking.

Method 800, at 840, can comprise fourth ranking the processed audio signals of the processed audio signal data. The fourth ranking can be based on network conditions for a network transporting the processed audio signal data between the SUE and the RUE. The network conditions can be received, for example, from a network operator device. The network conditions can relate to network congestion, bandwidth, speed, jitter, error correction, number of hops, or nearly any other network metric. In an aspect, the fourth ranking enables the selection of the processed audio signals of the processed audio signal data to better interact with a network needed for transporting the processed audio signal data. As an example, where a network is congested, more compressed processed audio signals can be better ranked than less compressed processed audio signals.

Method 800, at 850, can enable access to the at least one processed audio signal based on the first ranking, the second ranking, the third ranking, and the fourth ranking. At this point, method 800 can end. Method 800 enables the use of multiple rankings to select a processed audio signal. In an aspect, this can enable selection based on coordination between the four illustrated rankings. As an example, a processed audio signal can be initially selected based on, for example, moderate fidelity and moderate in processor use. The third ranking can be employed in conjunction with the first ranking and the second ranking to adjust, via the third ranking, which processed audio signal is accessed. The fourth ranking can be employed in conjunction with the first ranking, the second ranking, and the third ranking, to adjust, via the fourth ranking, which processed audio signal is accessed. Continuing the example, over several iterations, the combination of the first, second, and third rankings can result, for example, in converging on a processed audio signal associated with a lowest processor demand and lowest fidelity while still receiving audio experience feedback data indicating satisfactory performance. The convergence can be affected by network conditions and, as such, the fourth ranking, enables convergence on processed audio signal that, while associated with a lowest processor demand, lowest fidelity, and receiving audio experience feedback data indicating satisfactory performance, also satisfies selection rules related to traversing a network. As an example, congested network conditions may only allow for selection of a processed audio signal that does not receive favorable audio experience feedback data. As a further example, uncongested network conditions may allow for selection of a processed audio signal that can receive more favorable audio experience feedback data indications with only a slight increase in processor demand.

Figure 9:
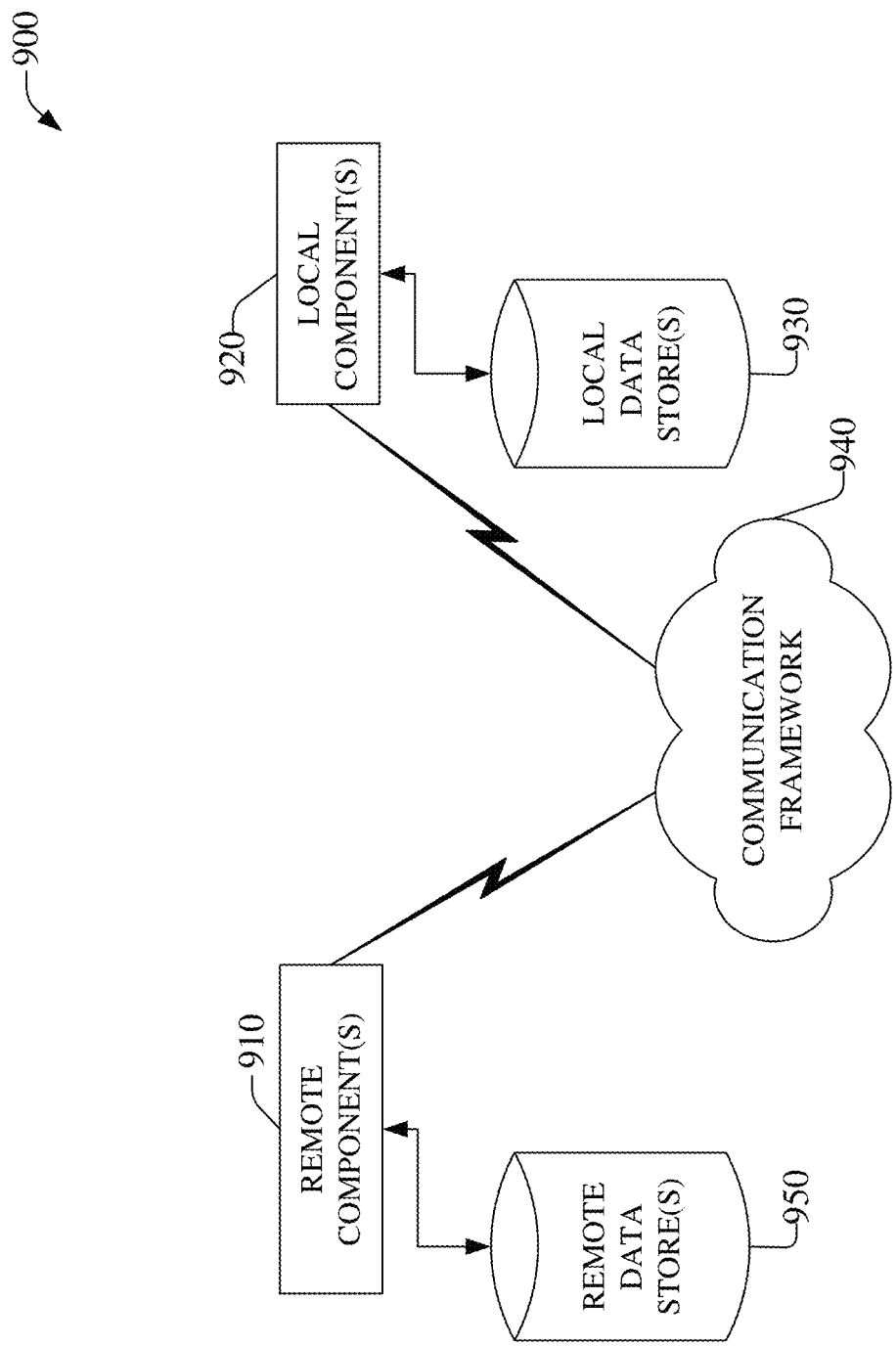
FIG. 9 depicts an example schematic block diagram of a computing environment with which the disclosed subject matter can interact.

FIG. 9 is a schematic block diagram of a computing environment 900 with which the disclosed subject matter can interact. The system 900 comprises one or more remote component(s) 910. The remote component(s) 910 can be hardware and/or software (e.g., threads, processes, computing devices). In some embodiments, remote component(s) 910 can comprise audio processing component(s) 190-192, etc., UE 250, etc., UI component 252, etc.

The system 900 also comprises one or more local component(s) 920. The local component(s) 920 can be hardware and/or software (e.g., threads, processes, computing devices). In some embodiments, local component(s) 920 can comprise audio selection component 110, 210, 310, 410, etc., selection engine 120, 320, etc., UE 230, etc., audio source component 240, etc., preference component 242, etc., audio processing component(s) 290-292, 390-392, etc., selection component 328, 428, etc., transcoding parameter component 326, etc., audio parameter component 324, etc.

One possible communication between a remote component(s) 910 and a local component(s) 920 can be in the form of a data packet adapted to be transmitted between two or more computer processes. Another possible communication between a remote component(s) 910 and a local component(s) 920 can be in the form of circuit-switched data adapted to be transmitted between two or more computer processes in radio time slots. The system 900 comprises a communication framework 940 that can be employed to facilitate communications between the remote component(s) 910 and the local component(s) 920, and can comprise an air interface, e.g., Uu interface of a UMTS network, via a long-term evolution (LTE) network, etc. Remote component(s) 910 can be operably connected to one or more remote data store(s) 950, such as a hard drive, solid state drive, SIM card, device memory, etc., that can be employed to store information on the remote component(s) 910 side of communication framework 940. Similarly, local component(s) 920 can be operably connected to one or more local data store(s) 930, that can be employed to store information on the local component(s) 920 side of communication framework 940. As examples, audio signal data 102, 202, 302, 402, etc., processed audio data from audio processing component(s) 190-192, 494, etc., audio experience feedback data 254, 255, etc., network condition data 497, etc., preference data 443, etc., can be received from corresponding remoted components.

Figure 10:
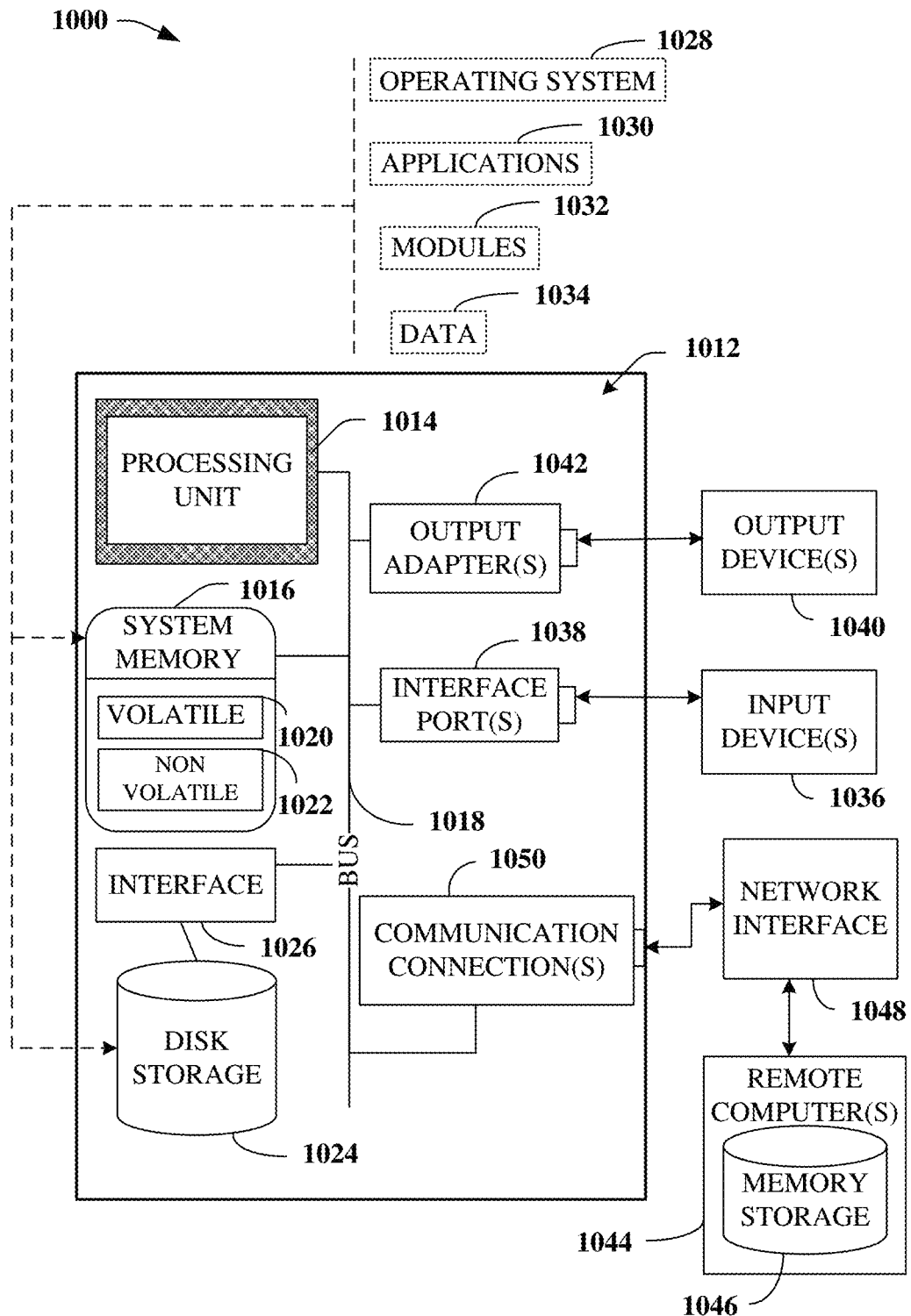
FIG. 10 illustrates an example block diagram of a computing system operable to execute the disclosed systems and methods in accordance with an embodiment.

In order to provide a context for the various aspects of the disclosed subject matter, FIG. 10, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that performs particular tasks and/or implement particular abstract data types.

In the subject specification, terms such as "store," "storage," "data store," data storage," "database," and substantially any other information storage component relevant to operation and functionality of a component, refer to "memory components," or entities embodied in a "memory" or components comprising the memory. It is noted that the memory components described herein can be either volatile memory or nonvolatile memory, or can comprise both volatile and nonvolatile memory, by way of illustration, and not limitation, volatile memory 1020 (see below), nonvolatile memory 1022 (see below), disk storage 1024 (see below), and memory storage 1046 (see below). Further, nonvolatile memory can be included in read only memory, programmable read only memory, electrically programmable read only memory, electrically erasable read only memory, or flash memory. Volatile memory can comprise random access memory, which acts as external cache memory. By way of illustration and not limitation, random access memory is available in many forms such as synchronous random access memory, dynamic random access memory, synchronous dynamic random access memory, double data rate synchronous dynamic random access memory, enhanced synchronous dynamic random access memory, SynchLink dynamic random access memory, and direct Rambus random access memory. Additionally, the disclosed memory components of systems or methods herein are intended to comprise, without being limited to comprising, these and any other suitable types of memory.

Moreover, it is noted that the disclosed subject matter can be practiced with other computer system configurations, comprising single-processor or multiprocessor computer systems, mini-computing devices, mainframe computers, as well as personal computers, hand-held computing devices (e.g., personal digital assistant, phone, watch, tablet computers, netbook computers, . . . ), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

FIG. 10 illustrates a block diagram of a computing system 1000 operable to execute the disclosed systems and methods in accordance with an embodiment. Computer 1012, which can be, for example, comprised in audio selection component 110, 310, 410, etc., UE 230, 250, etc., audio processing component 190-192, etc., can comprise a processing unit 1014, a system memory 1016, and a system bus 1018. System bus 1018 couples system components comprising, but not limited to, system memory 1016 to processing unit 1014. Processing unit 1014 can be any of various available processors. Dual microprocessors and other multiprocessor architectures also can be employed as processing unit 1014.

System bus 1018 can be any of several types of bus structure(s) comprising a memory bus or a memory controller, a peripheral bus or an external bus, and/or a local bus using any variety of available bus architectures comprising, but not limited to, industrial standard architecture, microchannel architecture, extended industrial standard architecture, intelligent drive electronics, video electronics standards association local bus, peripheral component interconnect, card bus, universal serial bus, advanced graphics port, personal computer memory card international association bus, Firewire (Institute of Electrical and Electronics Engineers 1194), and small computer systems interface.

System memory 1016 can comprise volatile memory 1020 and nonvolatile memory 1022. A basic input/output system, containing routines to transfer information between elements within computer 1012, such as during start-up, can be stored in nonvolatile memory 1022. By way of illustration, and not limitation, nonvolatile memory 1022 can comprise read only memory, programmable read only memory, electrically programmable read only memory, electrically erasable read only memory, or flash memory. Volatile memory 1020 comprises read only memory, which acts as external cache memory. By way of illustration and not limitation, read only memory is available in many forms such as synchronous random access memory, dynamic read only memory, synchronous dynamic read only memory, double data rate synchronous dynamic read only memory, enhanced synchronous dynamic read only memory, SynchLink dynamic read only memory, Rambus direct read only memory, direct Rambus dynamic read only memory, and Rambus dynamic read only memory.

Computer 1012 can also comprise removable/non-removable, volatile/non-volatile computer storage media. FIG. 10 illustrates, for example, disk storage 1024. Disk storage 1024 comprises, but is not limited to, devices like a magnetic disk drive, floppy disk drive, tape drive, flash memory card, or memory stick. In addition, disk storage 1024 can comprise storage media separately or in combination with other storage media comprising, but not limited to, an optical disk drive such as a compact disk read only memory device, compact disk recordable drive, compact disk rewritable drive or a digital versatile disk read only memory. To facilitate connection of the disk storage devices 1024 to system bus 1018, a removable or non-removable interface is typically used, such as interface 1026.

Computing devices typically comprise a variety of media, which can comprise computer-readable storage media or communications media, which two terms are used herein differently from one another as follows.

Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can comprise, but are not limited to, read only memory, memristors, programmable read only memory, electrically programmable read only memory, electrically erasable read only memory, flash memory or other memory technology, compact disk read only memory, digital versatile disk or other optical disk storage, magnetic cassettes, magnetic tape, magnetic disk storage or other magnetic storage devices, or other tangible media which can be used to store desired information. In this regard, the term "tangible" herein as may be applied to storage, memory or computer-readable media, is to be understood to exclude only propagating intangible signals per se as a modifier and does not relinquish coverage of all standard storage, memory or computer-readable media that are not only propagating intangible signals per se. In an aspect, tangible media can comprise non-transitory media wherein the term "non-transitory" herein as may be applied to storage, memory or computer-readable media, is to be understood to exclude only propagating transitory signals per se as a modifier and does not relinquish coverage of all standard storage, memory or computer-readable media that are not only propagating transitory signals per se. Computer-readable storage media can be accessed by one or more local or remote computing devices, e.g., via access requests, queries or other data retrieval protocols, for a variety of operations with respect to the information stored by the medium. As such, for example, a computer-readable medium can comprise executable instructions stored thereon that, in response to execution, can cause a system comprising a processor to perform operations, comprising receiving, by audio selection component 110, 210, 310, 410, etc., audio signal data 102-420, etc., and processed audio signal data from audio processing component(s) 190-192, 290-292, 390-392, 494, etc.; determining ranking information, and determining selected audio signal data 104-404, etc., based on the ranking information.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

It can be noted that FIG. 10 describes software that acts as an intermediary between users and computer resources described in suitable operating environment 1000. Such software comprises an operating system 1028. Operating system 1028, which can be stored on disk storage 1024, acts to control and allocate resources of computer system 1012. System applications 1030 take advantage of the management of resources by operating system 1028 through program modules 1032 and program data 1034 stored either in system memory 1016 or on disk storage 1024. It is to be noted that the disclosed subject matter can be implemented with various operating systems or combinations of operating systems.

A user can enter commands or information into computer 1012 through input device(s) 1036. In some embodiments, a user interface can allow entry of user preference information, etc., and can be embodied in a touch sensitive display panel, a mouse/pointer input to a graphical user interface (GUI), a command line controlled interface, etc., allowing a user to interact with computer 1012. Input devices 1036 comprise, but are not limited to, a pointing device such as a mouse, trackball, stylus, touch pad, keyboard, microphone, joystick, game pad, satellite dish, scanner, TV tuner card, digital camera, digital video camera, web camera, cell phone, smartphone, tablet computer, etc. These and other input devices connect to processing unit 1014 through system bus 1018 by way of interface port(s) 1038. Interface port(s) 1038 comprise, for example, a serial port, a parallel port, a game port, a universal serial bus, an infrared port, a Bluetooth port, an IP port, or a logical port associated with a wireless service, etc. Output device(s) 1040 use some of the same type of ports as input device(s) 1036.

Thus, for example, a universal serial busport can be used to provide input to computer 1012 and to output information from computer 1012 to an output device 1040. Output adapter 1042 is provided to illustrate that there are some output devices 1040 like monitors, speakers, and printers, among other output devices 1040, which use special adapters. Output adapters 1042 comprise, by way of illustration and not limitation, video and sound cards that provide means of connection between output device 1040 and system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. Remote computer(s) 1044 can be a personal computer, a server, a router, a network PC, cloud storage, a cloud service, code executing in a cloud-computing environment, a workstation, a microprocessor-based appliance, a peer device, or other common network node and the like, and typically comprises many or all of the elements described relative to computer 1012. A cloud computing environment, the cloud, or other similar terms can refer to computing that can share processing resources and data to one or more computer and/or other device(s) on an as needed basis to enable access to a shared pool of configurable computing resources that can be provisioned and released readily. Cloud computing and storage solutions can store and/or process data in third-party data centers which can leverage an economy of scale and can view accessing computing resources via a cloud service in a manner similar to a subscribing to an electric utility to access electrical energy, a telephone utility to access telephonic services, etc.

For purposes of brevity, only a memory storage device 1046 is illustrated with remote computer(s) 1044. Remote computer(s) 1044 is logically connected to computer 1012 through a network interface 1048 and then physically connected by way of communication connection 1050. Network interface 1048 encompasses wire and/or wireless communication networks such as local area networks and wide area networks. Local area network technologies comprise fiber distributed data interface, copper distributed data interface, Ethernet, Token Ring and the like. Wide area network technologies comprise, but are not limited to, point-to-point links, circuit-switching networks like integrated services digital networks and variations thereon, packet switching networks, and digital subscriber lines. As noted below, wireless technologies may be used in addition to or in place of the foregoing.

Communication connection(s) 1050 refer(s) to hardware/software employed to connect network interface 1048 to bus 1018. While communication connection 1050 is shown for illustrative clarity inside computer 1012, it can also be external to computer 1012. The hardware/software for connection to network interface 1048 can comprise, for example, internal and external technologies such as modems, comprising regular telephone grade modems, cable modems and digital subscriber line modems, integrated services digital network adapters, and Ethernet cards.

The above description of illustrated embodiments of the subject disclosure, comprising what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components.

In addition, the term "or" is typically intended to mean an inclusive "or" rather than an exclusive "or." That is, unless specified otherwise, or clear from context, "X employs A or B" is intended to mean any of the natural inclusive permutations. That is, if X employs A alone, X employs B alone, X employs C alone, X employs A and B alone, X employs B and C alone, X employs A and C alone, or X employs A and B and C, then "X employs A, B or C" is satisfied under any of the foregoing instances. Moreover, articles "a" and "an" as used in the subject specification and annexed drawings should generally be construed to mean "one or more" unless specified otherwise or clear from context to be directed to a singular form. Moreover, the use of any particular embodiment or example in the present disclosure should not be treated as exclusive of any other particular embodiment or example, unless expressly indicated as such, e.g., a first embodiment that has aspect A but not aspect B, and a second embodiment that has aspect B but not aspect A, does not preclude a third embodiment that has aspect A and aspect B. The use of granular examples and embodiments is intended to simplify understanding of certain features, aspects, etc., of the disclosed subject matter and is not intended to limit the disclosure to said granular instances of the disclosed subject matter or to illustrate that combinations of embodiments of the disclosed subject matter were not contemplated at the time of actual or constructive reduction to practice.

Further, the term "include" is intended to be employed as an open or inclusive term, rather than a closed or exclusive term. The term "include" can be substituted with the term "comprising" and is to be treated with similar scope, unless otherwise explicitly used otherwise. As an example, "a basket of fruit including an apple" is to be treated with the same breadth of scope as, "a basket of fruit comprising an apple."

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "eNodeB," "home Node B," "home access point," and the like, are utilized interchangeably in the subject application, and refer to a wireless network component or appliance that serves and receives data, control, voice, video, sound, gaming, or substantially any data-stream or signaling-stream to and from a set of subscriber stations or provider enabled devices. Data and signaling streams can comprise packetized or frame-based flows. Data or signal information exchange can comprise technology, such as, single user (SU) multiple-input and multiple-output (MIMO) (SU MIMO) radio(s), multiple user (MU) MIMO (MU MIMO) radio(s), long-term evolution (LTE), LTE time-division duplexing (TDD), global system for mobile communications (GSM), GSM EDGE Radio Access Network (GERAN), Wi Fi, WLAN, WiMax, CDMA2000, LTE new radio-access technology (LTE-NX), massive MIMO systems, etc.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio access network. Authentication can refer to authenticating a user-identity to a user-account. Authentication can, in some embodiments, refer to determining whether a user-identity requesting a service from a telecom network is authorized to do so within the network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third-party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities, machine learning components, or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks comprise broadcast technologies (e.g., sub-Hertz, extremely low frequency, very low frequency, low frequency, medium frequency, high frequency, very high frequency, ultra-high frequency, super-high frequency, extremely high frequency, terahertz broadcasts, etc.); Ethernet; X.25; powerline-type networking, e.g., Powerline audio video Ethernet, etc.; femtocell technology; Wi-Fi; worldwide interoperability for microwave access; enhanced general packet radio service; second generation partnership project (2G or 2GPP); third generation partnership project (3G or 3GPP); fourth generation partnership project (4G or 4GPP); long term evolution (LTE); fifth generation partnership project (5G or 5GPP); third generation partnership project universal mobile telecommunications system; third generation partnership project 2; ultra mobile broadband; high speed packet access; high speed downlink packet access; high speed uplink packet access; enhanced data rates for global system for mobile communication evolution radio access network; universal mobile telecommunications system terrestrial radio access network; or long term evolution advanced. As an example, a millimeter wave broadcast technology can employ electromagnetic waves in the frequency spectrum from about 30 GHz to about 300 GHz. These millimeter waves can be generally situated between microwaves (from about 1 GHz to about 30 GHz) and infrared (IR) waves, and are sometimes referred to extremely high frequency (EHF). The wavelength ($\lambda$) for millimeter waves is typically in the 1-mm to 10-mm range.

The term "infer" or "inference" can generally refer to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference, for example, can be employed to identify a specific context or action, or can generate a probability distribution over states of interest based on a consideration of data and events. Inference can also refer to techniques employed for composing higher-level events from a set of events and/or data. Such inference results in the construction of new events or actions from a set of observed events and/or stored event data, whether the events, in some instances, can be correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

What has been described above includes examples of systems and methods illustrative of the disclosed subject matter. It is, of course, not possible to describe every combination of components or methods herein. One of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A device, comprising:
a processor; and
a memory that stores executable instructions that, when executed by the processor, facilitate performance of operations, comprising:
in response to receiving input audio data, determining a quality score based on comparing the input audio data to a processed version of the input audio data;
ranking the processed version of the input audio data based on the quality score corresponding to the processed version of the input audio data, wherein the ranking corresponds to a level of fidelity between processed audio represented by the processed version of the input audio data and input audio represented by the input audio data, a processing metric of a processing schema corresponding to the processed version of the input audio data, a first indication of satisfaction associated with performance of the processed version of the input audio data via a performing device, and a second indication of satisfaction associated with a performance condition of network equipment that enables transport of the processed version of the input audio data to the performing device;
adjusting the ranking of the processed version of the input audio data, resulting in an adjusted ranking, based on corresponding key performance metrics for the processed version of the input audio data;
in response to selecting the processed version of the input audio data based on the adjusted ranking and a threshold value, the selecting resulting in a selected processed version, processing subsequent input audio data, received subsequent to the input audio data, based on a processing technology employed by the selected processed version of the input audio data.

2. The device of claim 1, wherein the input audio data is prerecorded input audio data.

3. The device of claim 1, wherein the input audio data is live input audio data received via a microphone of a user equipment.

4. The device of claim 1, wherein the input audio data is live input audio data, and wherein the live input audio data comprises live human voice data.

5. The device of claim 1, wherein the corresponding key performance metrics comprise a transcoder bit rate for the processed version of the input audio data.

6. The device of claim 1, wherein the corresponding key performance metrics comprise a distortion value for the processed version of the input audio data.

7. The device of claim 1, wherein the corresponding key performance metrics comprise a network condition metric representative of a degree to which a network condition is present.

8. The device of claim 1, wherein the corresponding key performance metrics are received from a data store located remote from the device.

9. The device of claim 1, wherein the device is comprised in a user equipment.

10. The device of claim 1, wherein the processed version of the input audio data comprises a compressed version of the input audio data.

11. The device of claim 1, wherein the processed version of the input audio data comprises a digitized version of the input audio data.

12. The device of claim 1, wherein the processed version of the input audio data comprises a companded version of the input audio data.

13. The device of claim 1, wherein the determining the quality score comprises speech-to-text processing of the input audio data and of the processed version of the input audio data.

14. A method, comprising:
receiving, by a system comprising a processor and a memory, input audio data;
receiving, by the system, processed audio data corresponding to a processing of the input audio data;
determining, by the system, a first rank of the processed audio data based on a level of fidelity between processed audio represented by the processed audio data and input audio represented by the input audio data;
determining, by the system, a second rank of the processed audio data based on a processing metric of a processing schema corresponding to the processed audio data;
determining, by the system, a third rank of the processed audio data based on a first indication related to a level of satisfaction associated with performance of the processed audio data;
determining, by the system, a fourth rank of the processed audio data based on a second indication related to a performance condition of a user equipment comprising the processor; and
enabling, by the system, access to the processed audio data based on the first rank, the second rank, the third rank, and the fourth rank.

15. The method of claim 14, wherein the indication is a first indication, and further comprising:
determining, by the system, a fifth rank of the processed audio data based on a second indication related to a performance condition of network equipment, wherein the network equipment enables transport of the processed audio data to the receiving device, for the performance of the processed audio data, from a sending device;
wherein the enabling the access comprises enabling the access further based on the fifth rank.

16. A non-transitory machine-readable medium, comprising executable instructions that, when executed by a processor, facilitate performance of operations, comprising:
receiving input audio data;
receiving processed audio data corresponding to a result of a processing of the input audio data;
determining a first rank of the processed audio data based on a type of the input audio data and based on a level of fidelity between input audio represented by the input audio data and processed audio represented by the processed audio data;
determining a second rank of the processed audio data based on a performance metric of a processing schema corresponding to the processed audio data;
determining a third rank of the processed audio data based on a first indication related to a level of satisfaction associated with a rendering of the processed audio data by a receiving device that has received the processed audio data;
determining a fourth rank of the processed audio data based on a second indication related to a performance condition of network equipment, wherein the network equipment enables transport of the processed audio data to the receiving device; and
enabling access to the processed audio data based on the first rank, the second rank, the third rank, and the fourth rank.

17. The non-transitory machine-readable medium of claim 16, wherein the operations further comprise:
determining a fifth rank of the processed audio data based on a second indication related to a performance condition of a user equipment comprising the processor, and
wherein the enabling the access comprises enabling the access further based on the fifth rank.

18. The non-transitory machine-readable medium of claim 16, wherein the input audio data represents music.

19. The non-transitory machine-readable medium of claim 16, wherein the processed audio data comprises a companded version of the input audio data.

20. The non-transitory machine-readable storage medium of claim 16, wherein the processed audio data comprises a digitized version of the input audio data.

* * * * *